March 16, 1954  T. S. SKILLMAN  2,672,289
ARTICLE DISPENSING SYSTEM
Original Filed May 13, 1949
16 Sheets-Sheet 1

Inventor
Thomas S. Skillman
by Ward, Crosby & Neal
Attorneys

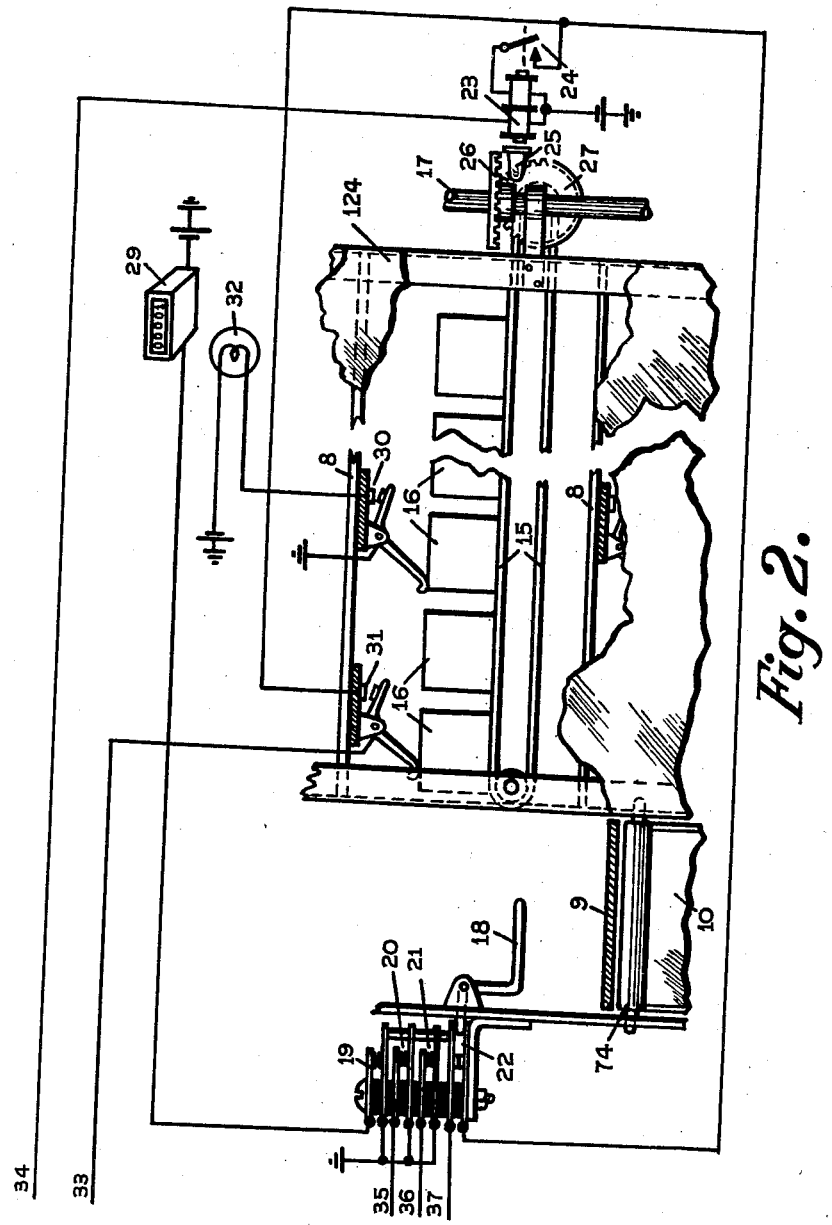

March 16, 1954

T. S. SKILLMAN 2,672,289

ARTICLE DISPENSING SYSTEM

Original Filed May 13, 1949

Inventor
Thomas S. Skillman
by Ward, Crosby & Neal
Attorneys

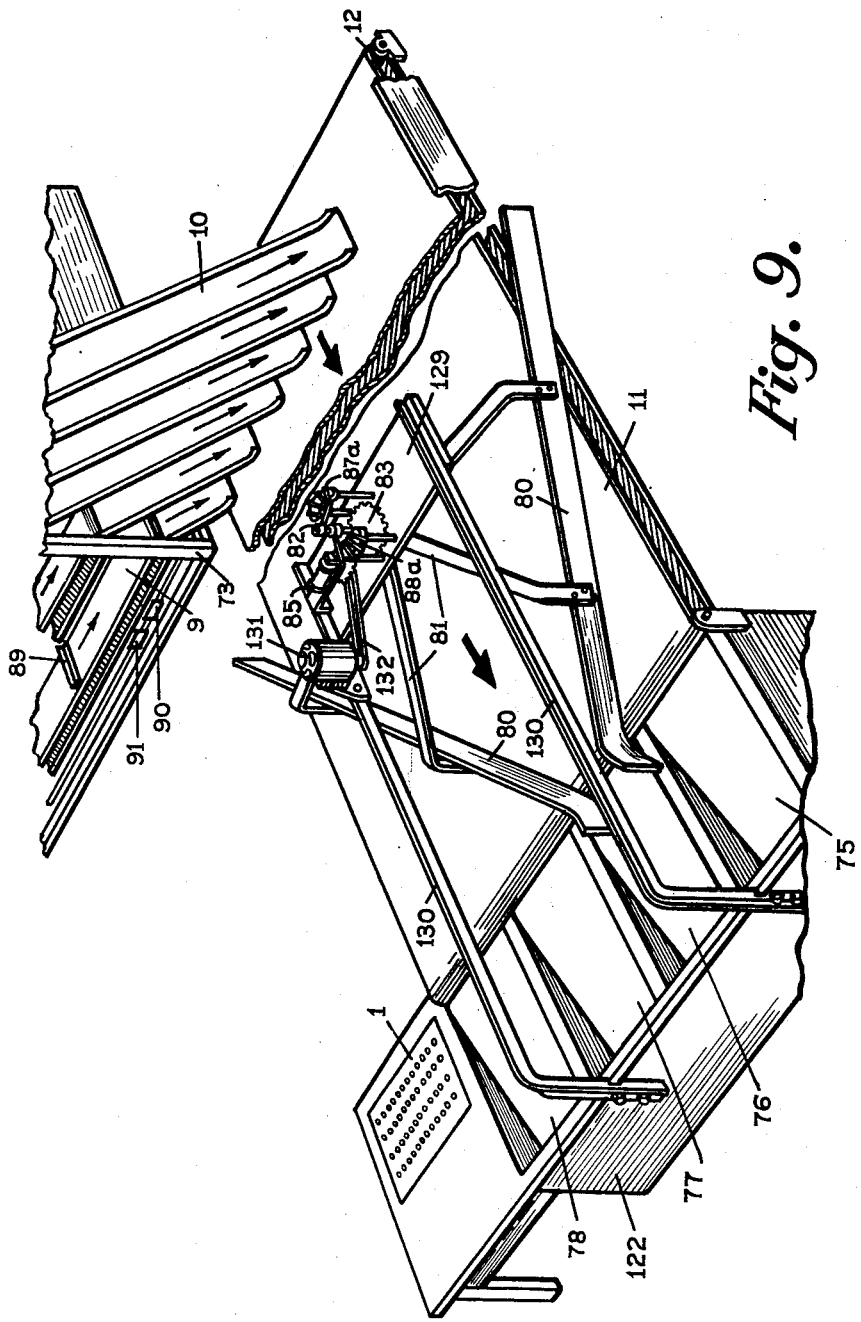

March 16, 1954     T. S. SKILLMAN     2,672,289
ARTICLE DISPENSING SYSTEM
Original Filed May 13, 1949     16 Sheets—Sheet 14

Inventor
Thomas S. Skillman
by Ward, Crosby & Neal
Attorneys

March 16, 1954 — T. S. SKILLMAN — 2,672,289
ARTICLE DISPENSING SYSTEM
Original Filed May 13, 1949 — 16 Sheets-Sheet 15

Inventor
Thomas S. Skillman
by Ward, Crosby & Neal
Attorneys

Patented Mar. 16, 1954

2,672,289

UNITED STATES PATENT OFFICE 2,672,289

ARTICLE DISPENSING SYSTEM

Thomas S. Skillman, Mosman, near Sydney, New South Wales, Australia, assignor to Punch Engineering Pty. Limited, New South Wales, Australia, a company of New South Wales Original application May 13, 1949, Serial No. 93,206. Divided and this application June 7, 1951, Serial No. 230,272

Claims priority, application Australia February 24, 1945

6 Claims. (Cl. 235—92)

This invention relates to a system for dispensing articles of various character from storage.

This application is a division of my co-pending application Serial No. 93,206, filed May 13, 1949, now Patent No. 2,657,858, which latter in turn is a continuation-in-part of my co-pending parent application Serial No. 643,945, filed January 28, 1946 and now Patent No. 2,627,941.

It is an object of the invention to provide means whereby required quantities of different kinds of articles such as those constituting the stock of a shop or store may be automatically or semi-automatically dispensed from shelves or bins upon or in which they have been stacked or otherwise pre-arranged or grouped.

Each kind of article in the stock is allotted some characteristic code which identifies it, such as a sequence or combination of digits or letters or both and when this kind of article is required, keys or other electrical contacts are operated in accordance with this code to establish an electrical circuit which thereupon operates a releasing device associated with an article-holding device for the required kind of article and causes the required quantity thereof to be released from the storage position on to a conveying or distributing mechanism by which it is delivered to a receptacle, wrapping counter or other desired destination. Each of said article-holding devices comprises a movable member on which said articles stand or lie and means operated by said electrical circuit to move the movable member so that each article in turn is brought into a position where it moves away from the remaining articles by the action of gravity. In this manner selections of required articles from a very large number of different kinds of articles can be rapidly carried out and the usual process whereby storemen, or shop assistants walk around and collect articles from shelves or bins is eliminated.

A registering and indicating device can be associated with the aforesaid devices whereby a record of the kind, quantity and/or value of the articles collected is recorded. This record in the form of a ticket is delivered with the articles and shows the total price which the customer has to pay.

The stock can be located in a position remote from the operating devices, whereby the use of expensive shop front space for storage is avoided. For example, a small fronted shop contains the operation position and delivery position and the articles are brought automatically by conveyor from a store located at a remote point, such as the back yard or an upper storey where storage costs are much less.

The release of the articles on to the conveyor system can be effected by means of a magnetic clutch, which is energised as part of said electrical circuit and causes a continuously moving member such as a rotating shaft to move the articles forward so that the foremost article topples under the action of gravity on to the conveying system. During its fall it operates an electrical contact mechanism which causes the de-energisation of said magnetic clutch and thus the cessation of the forward movement of the articles.

When a plurality of articles of the same kind have to be released, the aforesaid electrical contact when operated by the falling articles is caused to interwork with a counting mechanism, said counting device being set to the required number whereby articles continue to be released until the counting mechanism is counted out.

It is a feature of the invention to provide code-storing devices whereby the codes indicative of the required articles can be stored and thus a number of different batches of articles may be set up irrespective of whether the releasing and/or conveying mechanism is ready to handle them. In this manner the same conveying and releasing mechanism can be used to convey different batches, these being separated by the time at which they enter the conveying system.

It is another feature of the invention to combine the previously mentioned registering and indicating device with the code-storing devices to indicate and record the value of articles, the code of which has been stored in the code-storing devices.

Further features of the invention will be apparent from the description given below in connection with the drawings showing one particular embodiment of the invention.

Figure 2A:
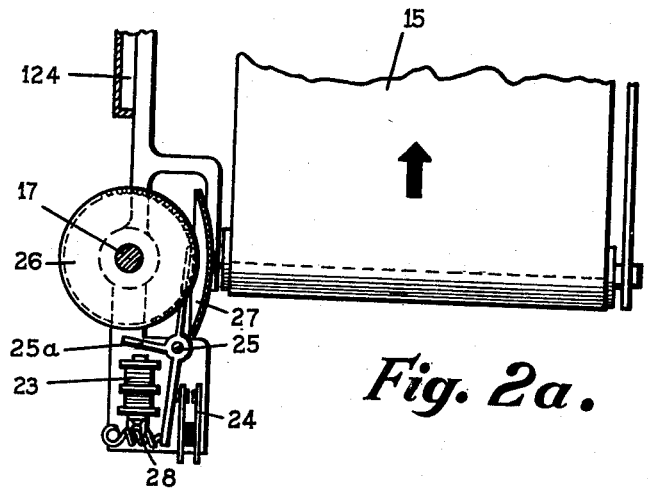
Fig. 2 shows details of the bin or shelf arrangement with the release mechanism.
Figure 2B:
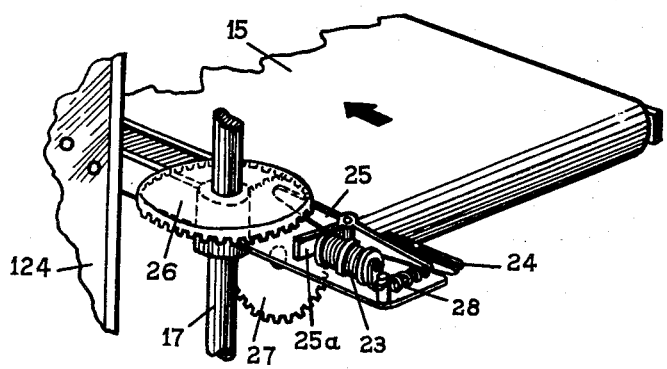

Fig. 2a and Fig. 2b give details of the clutch mechanism used for the arrangement shown in Fig. 2.

Figure 3:
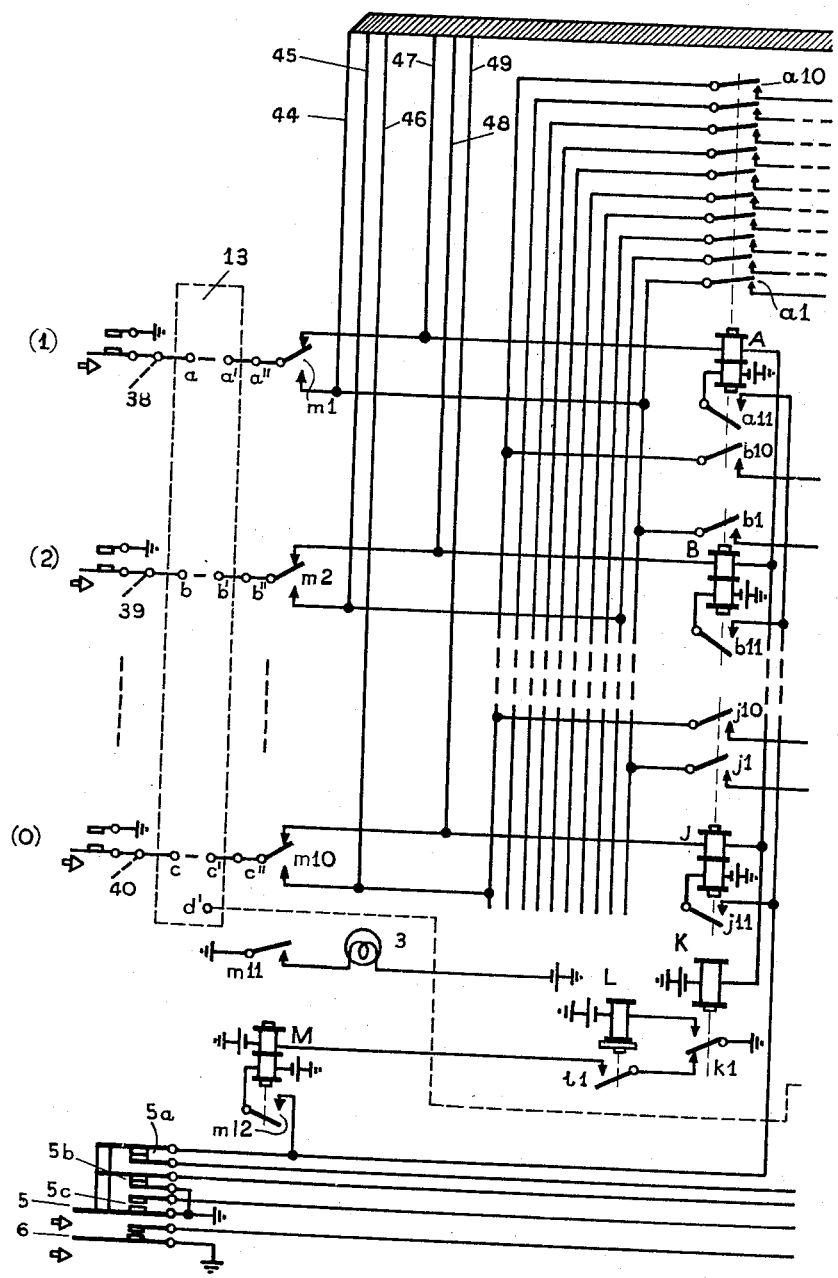
Figure 3A:
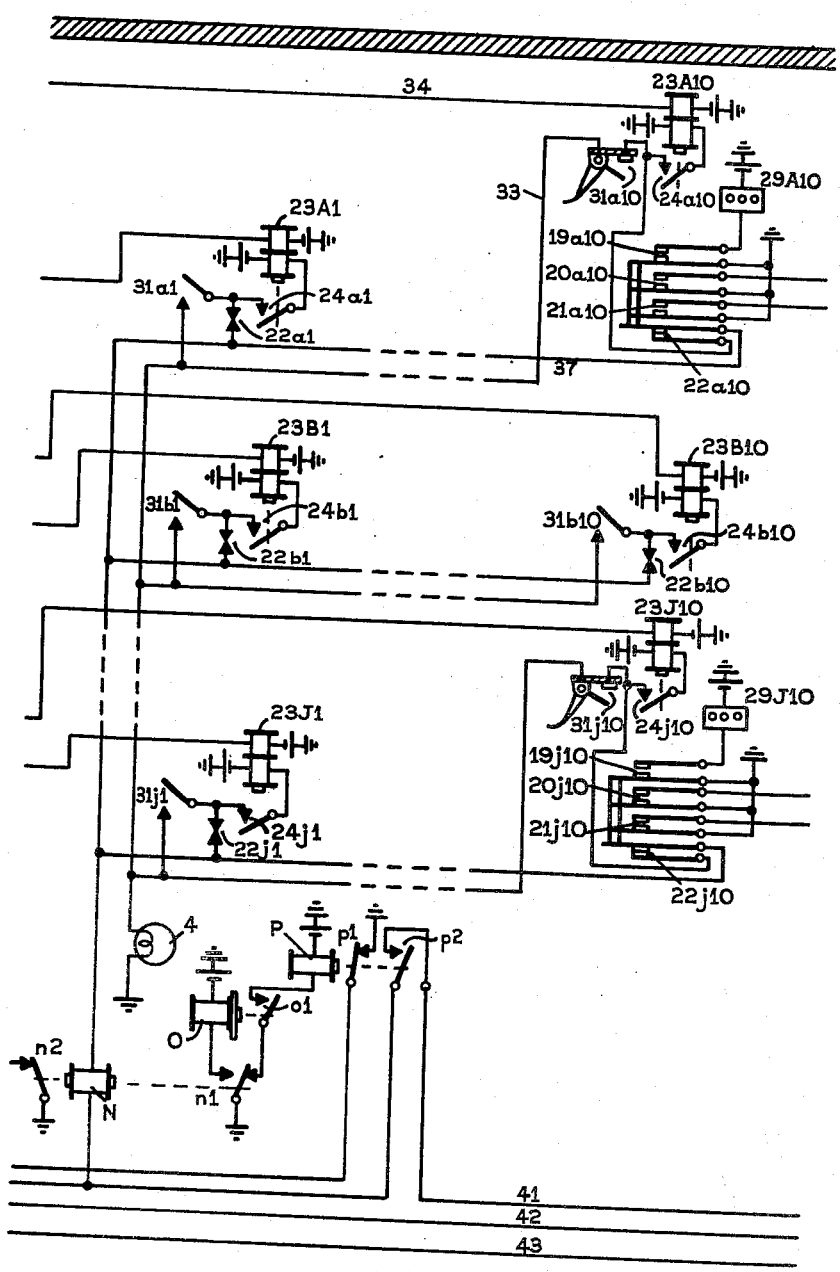

Fig. 3 and Fig. 3a are diagrams showing the circuits for the selection and release of articles.

Figure 4:
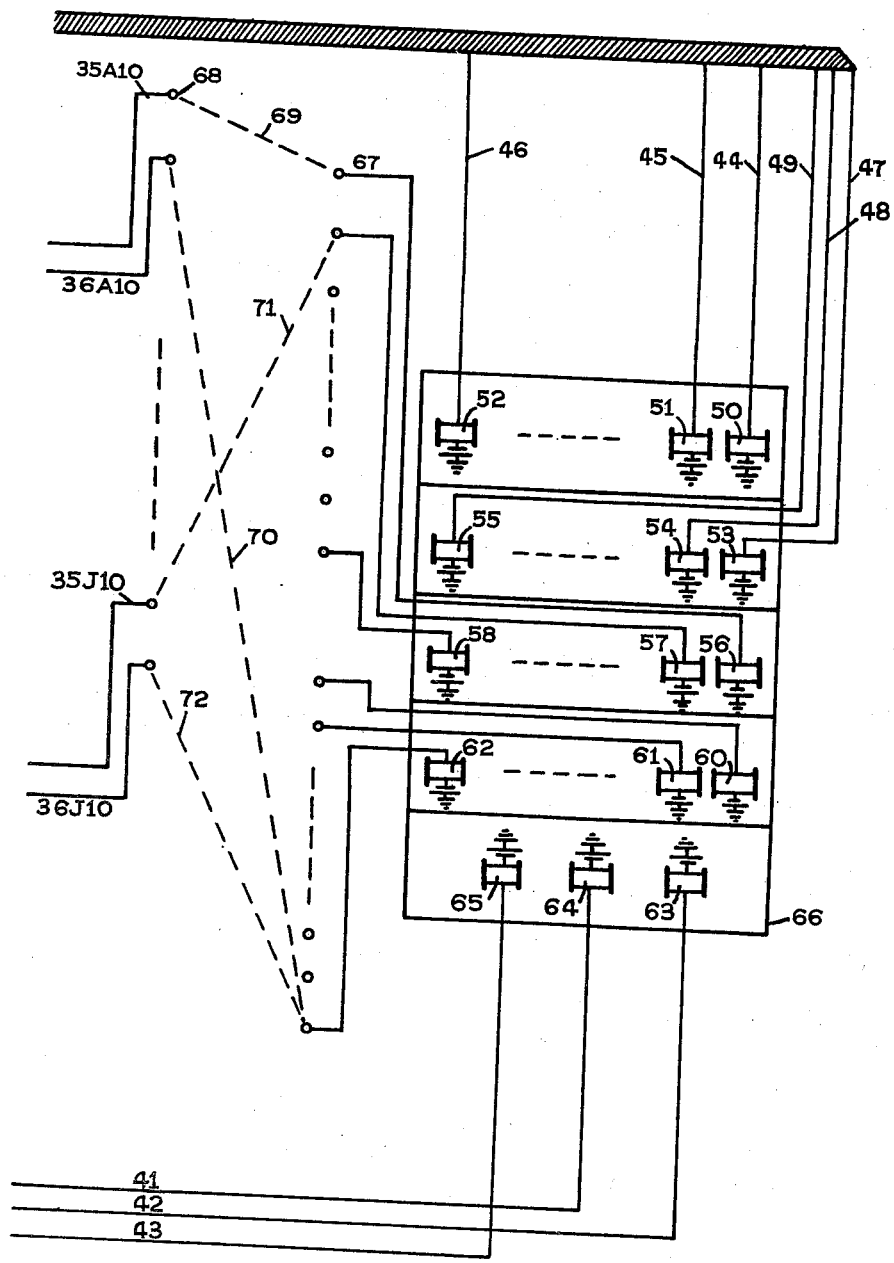

Fig. 4 gives schematically the connections for a registering and indicating device used in connection with a system operated in accordance with the electrical circuits as shown in Figs. 3 and 3a.

Figure 5:
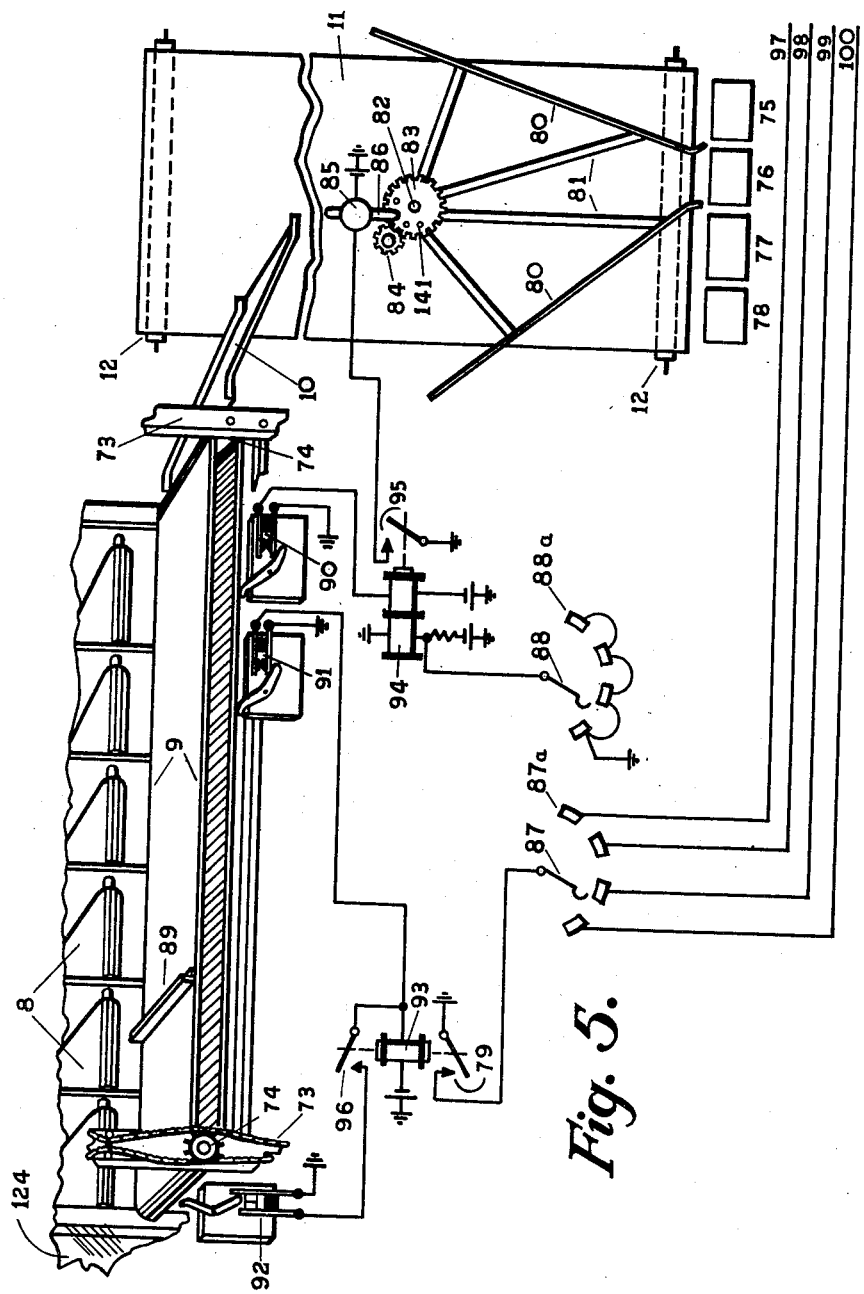

Fig. 5 gives details for an arrangement to distribute various batches of articles to a plurality of receptacles.

Figure 6:
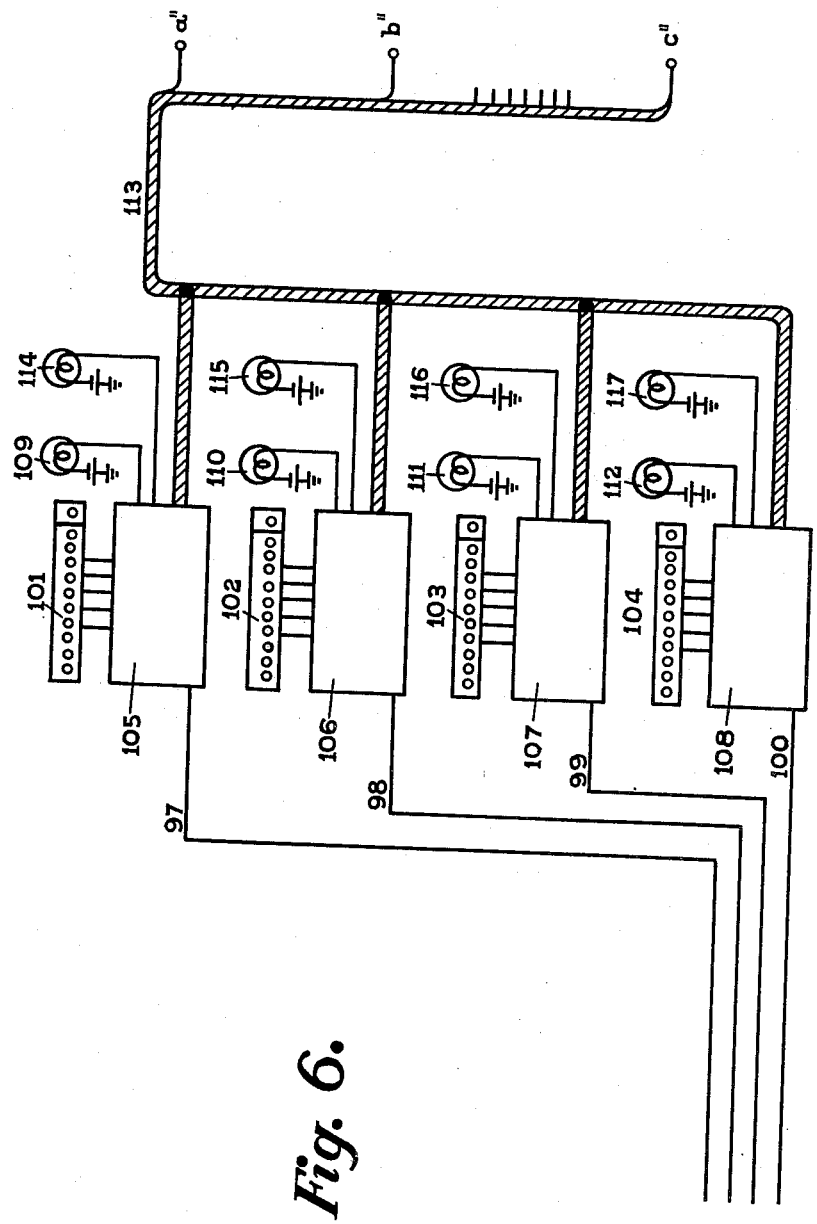

Fig. 6 shows diagrammatically the arrangement of a plurality of key sets and code-storing devices and the connections with an arrangement as shown in Fig. 3 and Fig. 5.

Figure 7:
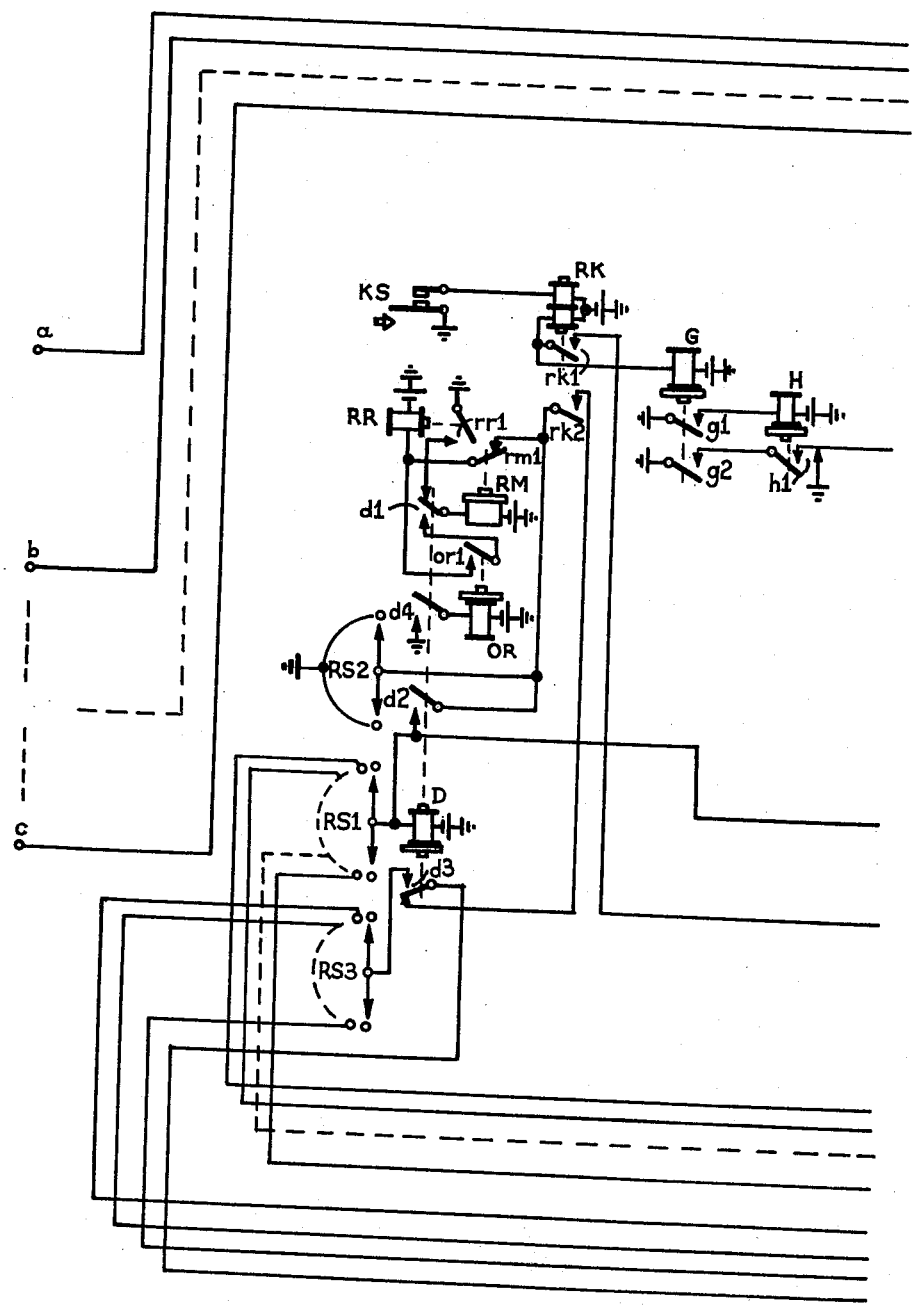
Figure 7A:
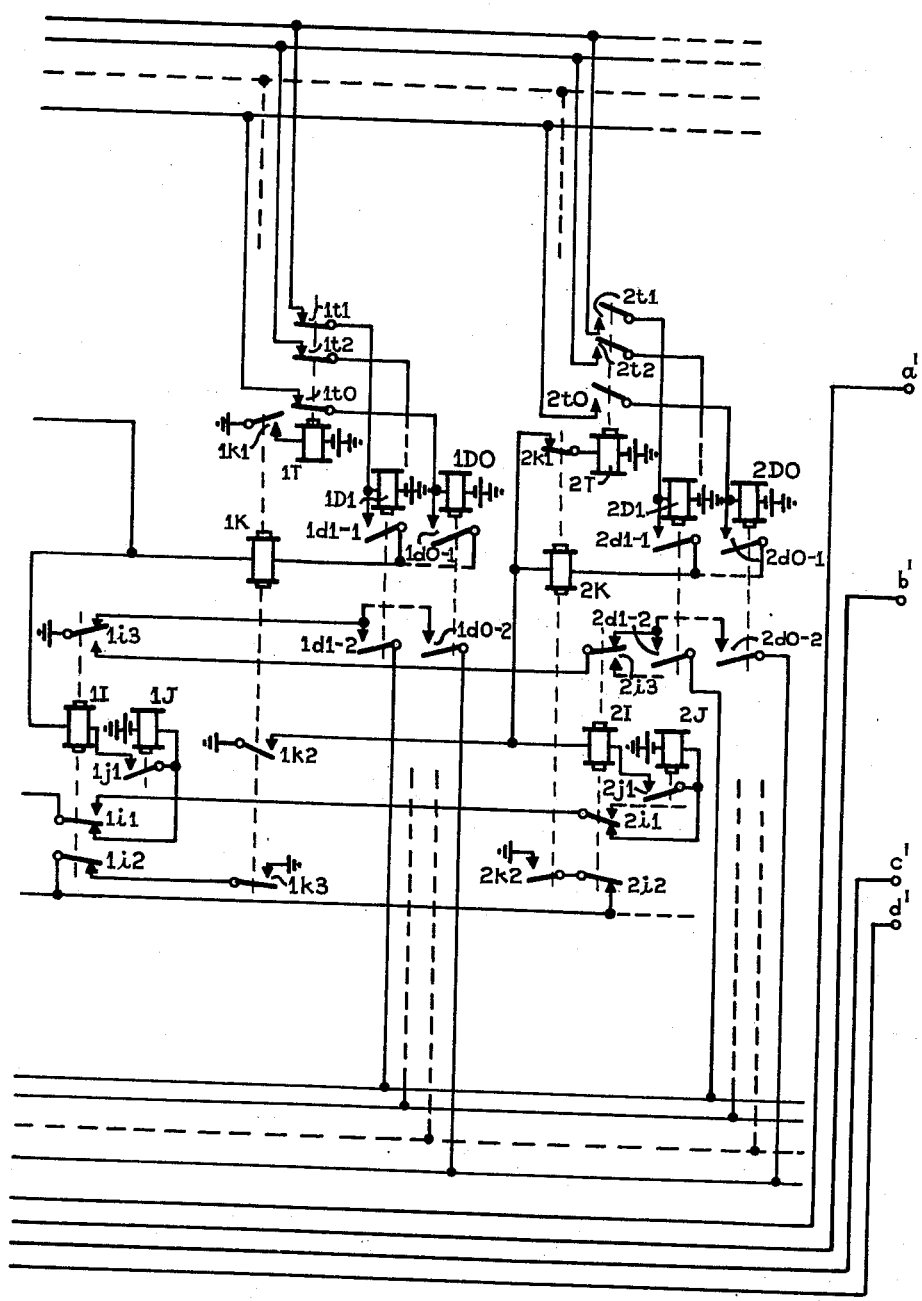

Fig. 7 and Fig. 7a show the circuit diagram for a code-storing device.

Figure 8:
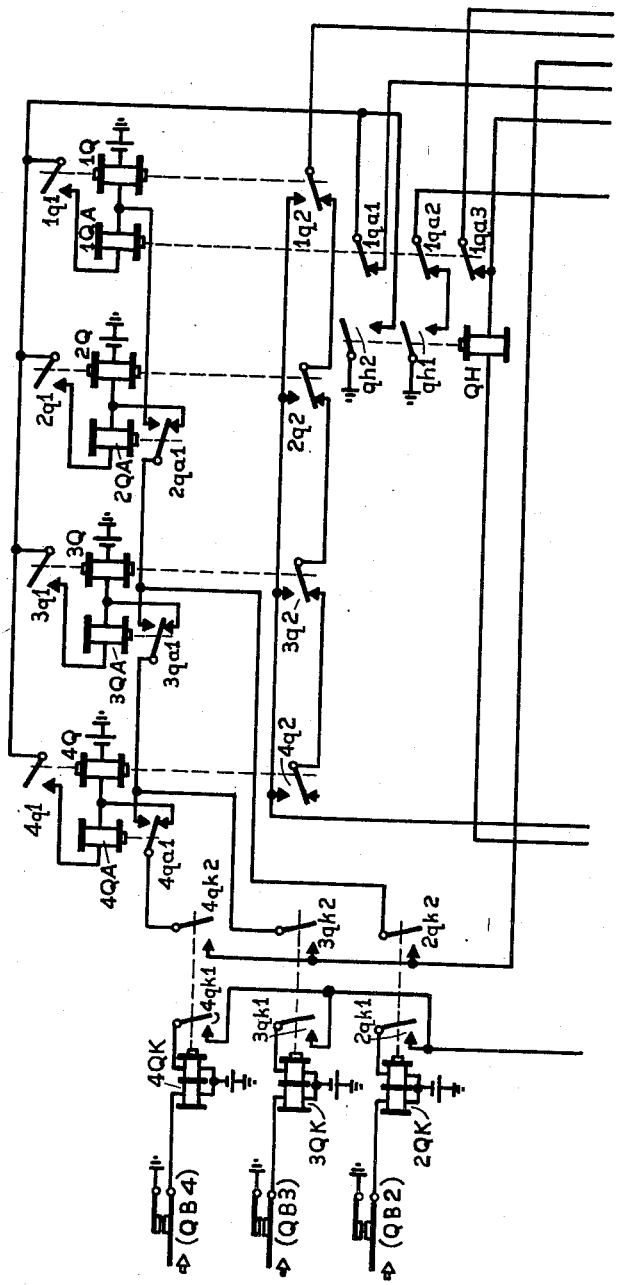
Figure 8A:
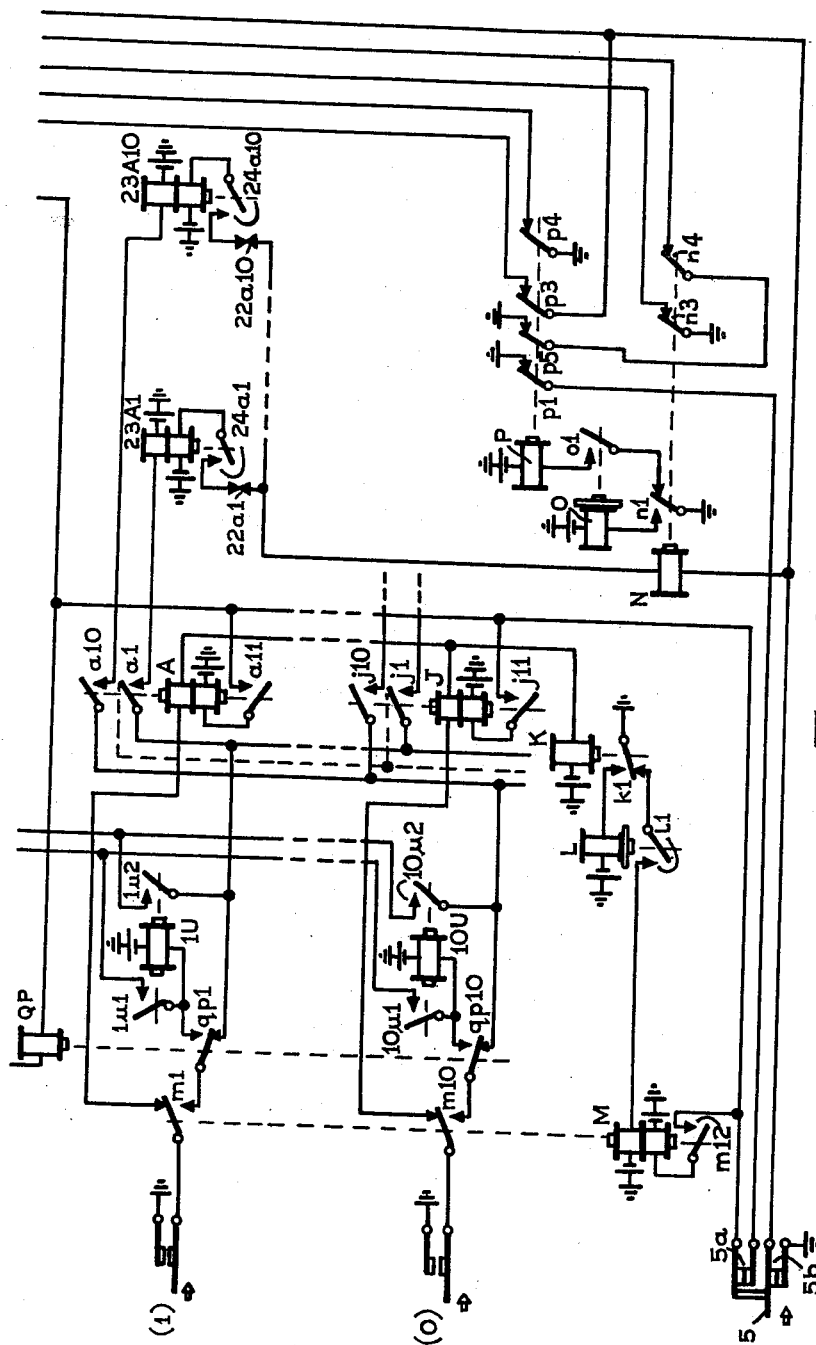
Figure 9A:
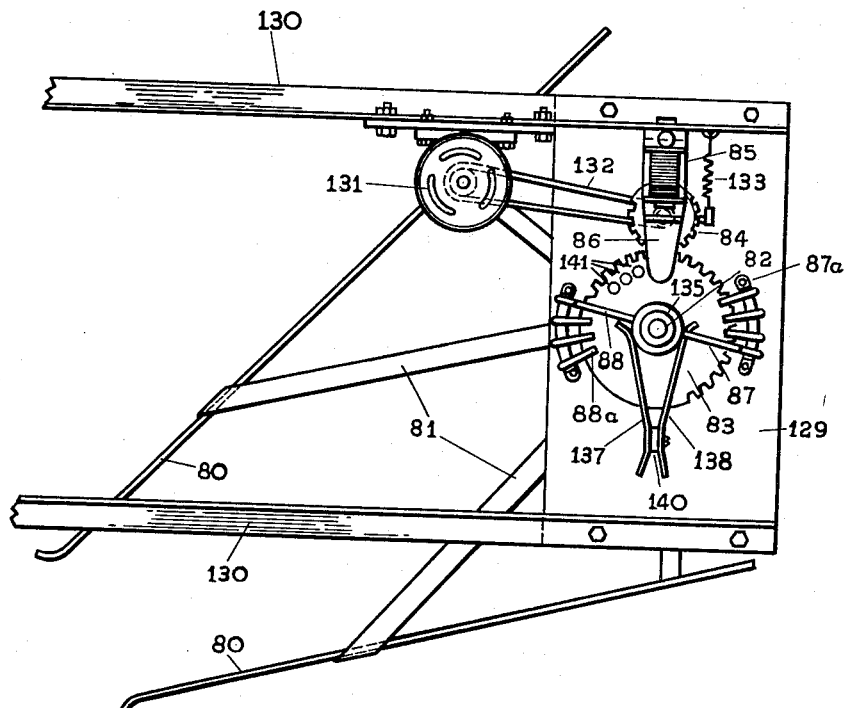
Figure 9B:
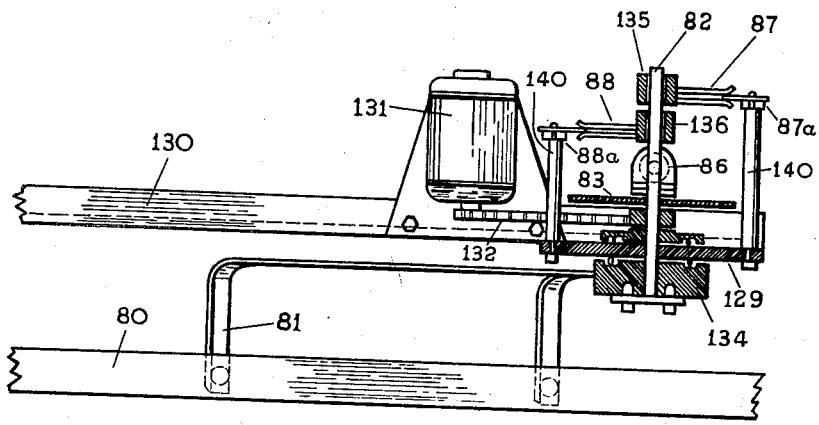
Figure 9C:
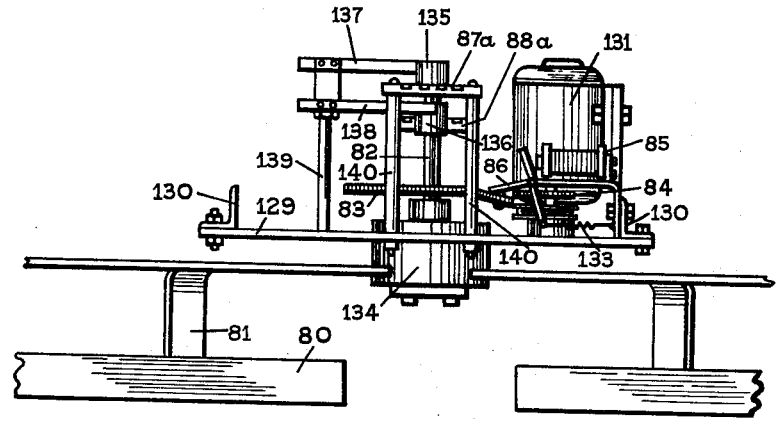

Fig. 8 and Fig. 8a show diagrammatically the arrangement for the selection of a plurality of articles of the same kind by the operation of "quantity" keys.

Figs. 9, 9a, 9b and 9c give details of the displaceable guide member for the distribution of articles into various receptacles as shown diagrammatically in Fig. 5.

Figure 10:
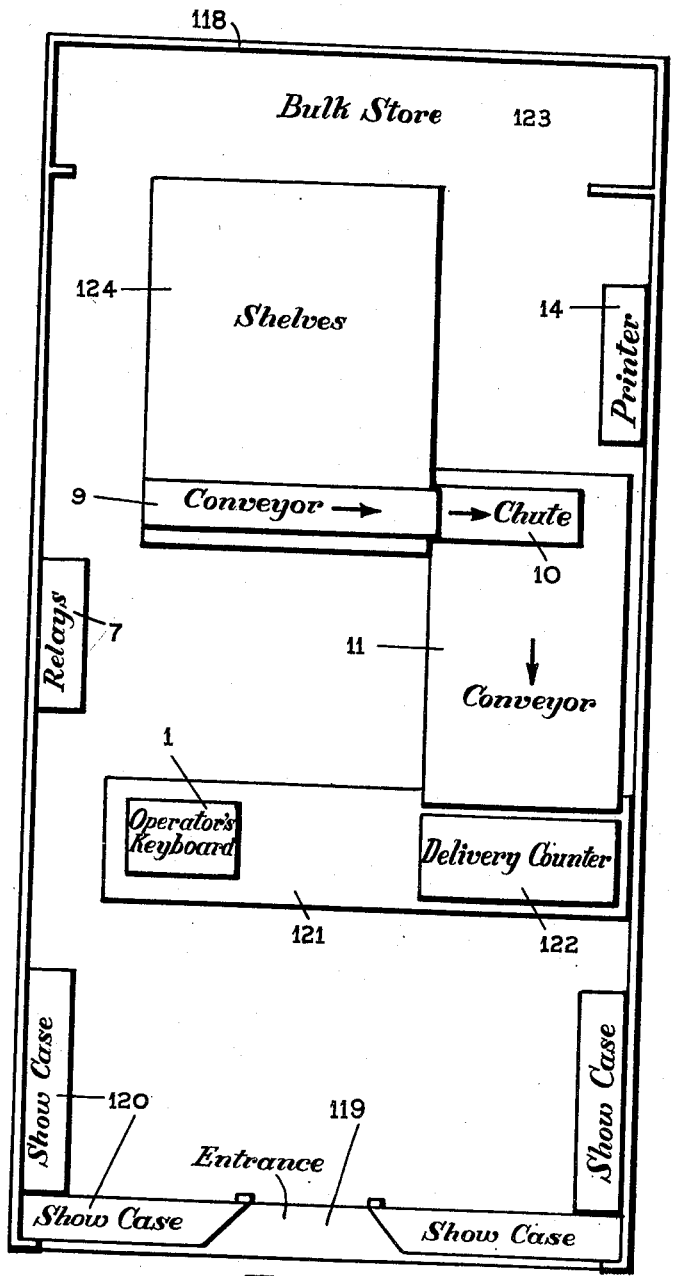

Fig. 10 shows an example of the layout of a shop using an article dispensing system according to the invention.

Figure 11:
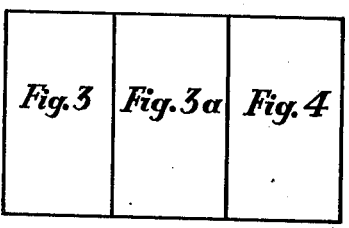
Figure 11:
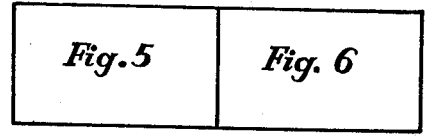
Figure 11:
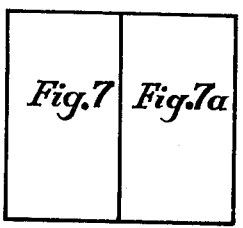
Figure 11:
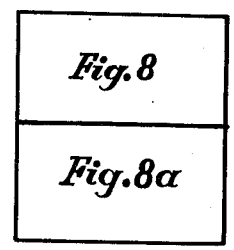

Fig. 11 shows how the various drawings fit together to complete the electrical circuits.

Figure 1:
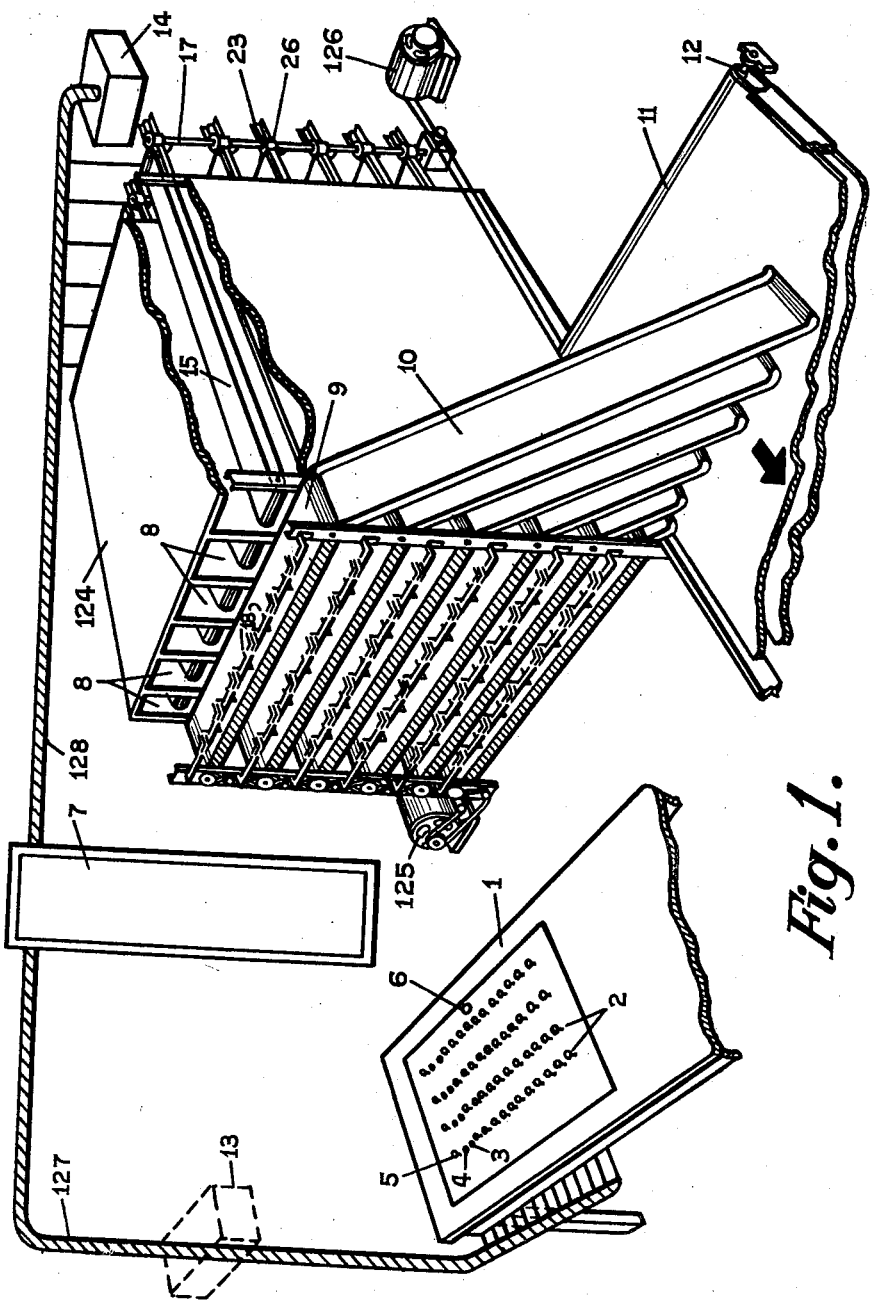
Fig. 1 shows diagrammatically a layout of the article dispensing system.

The system as shown in the layout of Fig. 1 provides for an operator's position, a selecting relay group and a shelf arrangement which contains the necessary mechanism for the dispensing of the articles together with conveyor means to transport the articles to the wanted localities. A registering and indicating device can be added if required. As the operator's position is only electrically connected with the shelf storage arrangement of the articles to be dispensed, this shelf arrangement can be separately placed from the operator's position and thus, for example, the operator's position can be located on the ground floor of a shop, while the storage arrangement itself including the article-holding devices is located at an upper floor, an adjacent building or in any other locality. In this case the selected articles are transported to the shop by suitable conveying means.

Furthermore, it is possible to locate the stock in a central store and to transfer orders from outlying offices to the store where they can be picked up after completion.

The stock numbers in the latter case can be transmitted by any known method of code or number transmission.

The selection of articles from the operator's position can be made by a shop assistant, or the customer himself may operate the mechanism to select his own goods.

The article dispensing system can be arranged for example as shown in Fig. 10. A shop 118 has next to its entrance 119 show cases 120 which display the various kinds of articles on sale through the dispensing system and give their individual code or stock numbers. The counter 121 is divided between the operator's position with the keyboard 1 and the delivery counter 122. The articles selected at the keyboard are released from the shelf arrangement 124 at the back of the shop and are then transported via conveyors 9, chutes 10 and conveyor 11 to the delivery counter 122. The necessary relays and other auxiliary devices for the system are arranged at the side of the shop as indicated at 7 and a printing device 14 can be so arranged that tickets showing the price of selected articles will be forwarded together with the articles themselves via conveyor 11. At the back of the shelf arrangement 124 is the bulk store 123, in which the articles are stored before they are put into the various shelves.

Returning to Fig. 1 the operator's position comprises a key set 1 which consists of a number of rows of ten keys as indicated at 2. Each row of ten keys is used for the selection of one hundred shelves, the number of rows of keys thus being dependent on the number of shelf groups comprising one hundred shelves each. At the end of each row of keys are arranged a "busy" lamp 3, a "no stock" lamp 4 and a "cancel" key 5. A further key 6 which is pressed whenever an order is completed is common to all the rows of keys. The functions of these keys and lamps will be described later on in detail.

The key set 1 is connected electrically via cable 127, the selecting group 7 containing the necessary relays and cable 128 with a shelf arrangement 124 in which the articles to be dispensed are stored. Each article-holding device (shelf or bin) marked by a square 8 contains one kind of article and associated with each horizontal row of bins are travelling belts 9 which run continuously driven by an electric motor 125 to collect the articles discharged from the horizontal rows of bins and transfer them to a wanted locality. Each article operates a trip contact 18 when it parts from its shelf. In the schematic layout of Fig. 1 the articles slide down chutes 10 and from there to a common conveyor belt 11, travelling over a roller 12, to a delivery counter (not shown).

Each shelf is fitted with a storage belt 15 on which the articles are stored and all these belts can be connected individually by a release and clutch arrangement 23, 26 with a common driving shaft 17, driven by a motor 126 which drives also the common conveyor 11.

Details of the belt and clutch arrangement to release articles from the shelves are shown in Figs. 2, 2a and 2b and will be described later on.

According to the invention a code- or numbering-storing device 13 is inserted between the key set 1 and the selecting group 7 and a registering and indicating device 14 can be added to print the code or stock number of the selected items and record their respective values.

When the operator receives the stock list giving the stock number of the articles required and the quantity of each of them, she keys the stock number on the key set and thereby operates the release mechanism associated with the corresponding bin.

The stock number or code consists of a preliminary digit or letter telling the operator which row of keys to select and is followed by two further digits representing a particular bin in one group of a hundred bins chosen by the preliminary digit. These latter two digits are pressed by the operator in succession on the selected row of keys. In the following description these latter two digits are referred to as the first and the second digit.

The articles selected and released from the bins fall on to a travelling belt 9 and from there down a chute 10 on to the common conveyor belt 11, which carries the articles to the delivery counter.

Details of the bin or shelf arrangement and release mechanism are shown in Fig. 2, Fig. 2a and Fig. 2b. Each bin 8 of the bin arrangement 124 is fitted with a movable belt 15 upon which the articles stand or lie as indicated by the articles 16. The movable belt which is normally stationary can be driven by a clutch mechanism from a continuously rotating shaft 17 when the release mechanism of this particular bin is operated as described in detail later on. In this case the belt 15 moves forward until the foremost article 16 is brought into a position where it overbalances and thus moves away from the remaining articles by the action of gravity.

The released article falls down on to the conveyor belt 9 which runs along a horizontal row of bins over roller 74, to transfer the articles to chute 10. While falling down from belt 15 each article actuates a trip lever 18. This trip lever 18 operates contacts 19, 20, 21 and 22 which amongst other functions interrupts at contact 22 the circuit of the previously operated release mechanism thus stopping further movement of the belt 15. It must be understood, however, that the stoppage of the belt can alternatively be performed by a contact at the belt itself or by a separate timing device, although the preferred arrangement is that described wherein the articles themselves operate the release contact.

The clutch mechanism itself shown in detail in Fig. 2a and Fig. 2b is similar to the clutch mechanisms used for rotary switches in automatic telephone systems as for example described in "Electrical Communication" January 1935. The clutch and release mechanism consists of a magnet 23 which operates a pair of contact springs 24 through a lever 25. Lever 25 is rotatably mounted and has two arms, one of them engaging the contact springs 24, the other arm engaging a flexible tooth wheel 27 mounted on the roller which drives the belt 15. A projection 25a on lever 25 acts as armature for the magnet 23. Connected with the continuously rotating shaft 17 is a tooth wheel 26 which can mesh with the flexible wheel 27. The lever 25 keeps the flexible wheel 27 out of gear with the wheel 26 under the action of a spring 28. Whenever the magnet 23 is energised over lead 34 (Fig. 2) as will be described in detail in connection with the electrical circuits shown in Fig. 3 and Fig. 3a, the projection 25a (Figs. 2a and 2b) of lever 25 is attracted, thus shifting the lever 25 against the force of spring 28 and closing the contact 24, which prepares another circuit for the magnet 23 via contact 22 (Fig. 2) and lead 37. At the same time the other arm of lever 25 removes pressure from the flexible wheel 27 so that the wheels 26 and 27 engage thus driving the belt 15 and bringing the articles 16 (Fig. 2) stored thereon to a position where they topple over to the collecting belt 9. One release mechanism consisting of magnet, lever and tooth wheels is provided for each stock bin, and mounted on the framework of bin arrangement 124 but the permanently rotating shaft 17 runs up at the rear of the bins and drives all the belts in one vertical row of bins.

The trip contact mechanism operated by trip lever 18 (Fig. 2), is operated whenever an article 16 leaves the storage belt 15 and topples over to the common conveyor belt 9. The lever 18 operates a contact pack or pile-up consisting of the contacts 19, 20, 21 and 22 as mentioned above. The contact 22 is a break contact which interrupts the circuit from lead 37 to magnet 23 (which was previously operated over lead 34 and held over its own contact 24). The magnet 23 releases lever 25 which returns to its initial position and disengages wheels 26 and 27, thus stopping further movement of the belt 15 when an article is released. The contacts 20 and 21 are used for a price indication, as will be described later on in connection with Fig. 3a and Fig. 4. The contact 19 is used to operate a message register 29 of a type similar to that used in telephone practice. This message register 29 is operated from earth over contact 19, register 29 to battery once each time an article is released from the storage belt 15, thus indicating directly the number of articles issued from a particular bin.

Trailer contacts 30 and 31 are provided for each bin to give an indication whenever the stock in the respective bin falls low or is exhausted. The trailer contact 30 lights an indication lamp 32 when no more articles pass underneath it, warning the attendants that the stock is nearly exhausted. When the last article has left the bin contact 31 is closed and operates a "no stock" lamp (4 in Figs. 1 and 3a) over the leads 33 and 37 as shown in more detail in Fig. 3a. This "no stock" lamp lights whenever a bin has been selected by an operator, and the article is not available.

Details of the electrical circuits used for the selection and release of articles from the various bins are shown in Figs. 3 and 3a. One row of ten keys is used for the selection of articles from one group comprising one hundred bins. Only the keys representing the digits (1), (2) and (0) for one group are shown to simplify the diagram, and it must be understood that the circuits for the remaining keys and the corresponding relays are connected in the same manner. The relays are marked with capital letters and the relay contacts themselves are marked with a small letter corresponding to the capital letter of the relay. All contacts are drawn in the unoperated position. The release mechanisms for the various bins are marked with the references A1...A10, B1...B10, up to J1...J10 and the numerical prefixes in the references correspond with the references on Fig. 2. Although the contact arrangements for the release mechanisms A10 and J10 only are shown in full detail corresponding to the arrangement shown in Fig. 2, it must be understood that all release mechanisms for the various bins are built alike. Thus for example magnets 23A10 and 23B10 of Fig. 3a both correspond with magnet 23 of Fig. 2.

The magnets 23A1 to 23A10 indicate the first row of bins; magnets 23B1 to 23B10 indicate the second row, and magnets 23J1 to 23J10 indicate the last row, corresponding to 100 different bins from which articles can be selected by the one row of keys as will be described in detail.

As a two digit stock number is necessary to dispense articles from one bin group, selecting relays A to J are provided for selection according to the first digit. These relays together with several other common relays form part of the selecting group 7 (Fig. 1).

The digit keys (1), (2) . . . (0), the "cancel" key 5, the "batch completed" key 6, the "busy" lamp 3 and the "no stock" lamp 4 form part of the operator's position as was mentioned already in connection with Fig. 1.

The working of the circuit shown in Figs. 3 and 3a will now be described in detail in connection with the selection of one article. In case no code-storing device is used the terminals $a$ and $a^1$, $b$ and $b^1$, $c$ and $c^1$ are directly connected with each other on panel 13, Fig. 3. It may be assumed that the first and second digit of the stock number assigned to this article are given as the figures 1 and 0. When the operator presses the key (1) to key-up the first digit, earth is put on the contact $m1$ and thus energises the relay A in series with the relay K. The relay A closes its contacts $a1$ to $a11$. Contact $a11$ closes a circuit from battery over a second winding of relay A via break contact $5a$ of the "cancel" key 5 and the break contact $p1$ to earth. At the same time the contacts $a1$ to $a10$ connect the magnets 23A1 to 23A10 with ten common leads representing the digit values 1 to 0.

The relay K over its contact $k1$ closes the circuit for the relay L which in turn prepares over its contact l1 a circuit for the relay M.

When the operator releases the key (1) in readiness to key-up the second digit, earth is removed from the upper winding of relay A and relay K. Relay A remains energised over its second winding but relay K is de-energised and its contact k1 falls back again. As the relay L is a slow release relay its contact l1 is still closed when the contact k1 falls back and thus a circuit is completed momentarily for the relay M which operates from earth over contact k1, contact l1, relay M to battery; and via its make contact m12, break contact 5a of the "cancel" key 5 and the break contact p1 closes a holding circuit over its second winding to which battery is connected, as shown. The "busy" lamp 3 lights up over the make contact m11 to indicate that a selection of articles is in progress. The change-over contacts m1 to m10 connected with the keys (1) to (0) are all switched over and thus connect the keys (1) to (0) directly with the common leads representing the digit values 1 to 0 and connected with the contacts of the relays A to J.

When the operator presses now the key (0) to select the second digit, earth is placed over this key and operated contact m10 on the common lead representing the digit "0" and via this lead and the previously closed contact a10 and lead 34 on the magnet 23A10 corresponding to the stock number 10 of the article to be dispensed. The magnet 23A10 closes its contact 24a10 and thus provides a circuit from battery over its second or holding winding, contact 24a10, the trip contact 22a10, lead 37, the relay N and the break contact 5b of key 5 to earth, so that magnet 23A10 remains operated when the key (0) is released again.

The relay N via its contact n1 operates the slow release relay O which prepares over its contact o1 a circuit for the relay P.

Furthermore, the magnet 23A10 operates the clutch mechanism (shown in detail in Figs. 2, 2a and 2b) to connect the common driving means with the storage belt 15 (Fig. 2) of the particular bin thus moving the selected article forward until it falls out on to a collector belt 9 (Fig. 2) at the same time operating a trip lever mechanism 18 (Fig. 2).

As soon as the selected article has been discharged from the bin and has operated the trip lever mechanism, the contact 22a10 (Fig. 3a) is interrupted momentarily thus interrupting the holding circuit of the magnet 23A10, which releases its armature, opening contact 24a10 and stopping the storage belt and furthermore releasing the relay N which now energises the relay P over its contact n1 and the closed contact o1. This relay at its break contact p1 removes earth from the cancel key 5 and thus interrupts the holding circuits for the relays M and A. The function of contact p2 will be described later. The slow release relay O then releases as its circuit is interrupted at contact n1 and thus deenergises relay P, so that the whole selecting circuit is restored to normal.

Any other digit or digit combination representing another stock number can be set up in the same way. If the first digit is, for example, the digit 2, relay B would be operated instead of relay A and then the selection of the second digit would operate one of the magnets 23B1 to 23B10. Any other method of selecting bins may be used without departing from the spirit of the invention, for example a step by step or other selector switch system whether under control of a register or of an operator directly. As already shown in connection with Fig. 2 each bin is connected with a message register to indicate the quantity of articles discharged from each bin. These message registers are shown for two bins in Fig. 3a as the registers 29A10 and 29J10 which are operated over the contacts 19a10 and 19j10 respectively, when an article operates the corresponding trip mechanism. Although only two registers are shown, all the bins can be equipped in the same way.

In the case the selected article, for example with the stock number 10, is out of stock, the corresponding trailer contact 31a10 (contact 31 in Fig. 2) is closed. When the magnet 23A10 is energised a circuit is closed over its second winding, its contact 24a10, contact 31a10, lead 33, "no stock" lamp 4 to earth, lamp 4 lights up and thus indicates to the operator that this selected item is not available.

The operator then presses the "cancel" key 5, thus momentarily interrupting at contacts 5a and 5b the circuit already set up for the selection of this item. The same operation is performed whenever a selection shall be cancelled before the selected article has left the bin.

When it is desirable to make a record of the stock number of each dispensed article and the price thereof a recording and printing device (14 in Fig. 1) can be provided as shown schematically in Fig. 4. Such devices are known in themselves and are for example used in a calculating machine as described in Brit. Pat. No. 314,026. The printer 66 consists of rows of 10 magnets for example 50, 51 up to 52 and prints a digit determined by the magnet which is energised. It will be clear that the operation of the keys in Fig. 3 can be used to operate such a mechanism to record the number at the printer. This is done by connecting the back contacts of the relay contacts m1, m2 to m10 (Fig. 3) to the magnets 50, 51 up to 52 in Fig. 4 as shown by the connecting leads 44, 45, 46. Thus the first digit is printed. The front contacts of the relay contacts m1, m2 to m10 in Fig. 3 are connected via the leads 47, 48, 49 to the next row of 10 magnets 53, 54 to 55 of printer 66 in Fig. 4 thus printing the second digit. In this way the stock number will be printed on a card. (The printing of a preliminary digit indicated by the row of keys chosen has not been shown in the drawing. It will be clear that another row of magnets such as 50, 51 each operated from one of the various relays M, associated with the various rows of keys, can be provided to print the preliminary digit.)

The trip mechanism 18 (Fig. 2) operates contacts 20 and 21, as mentioned before. These contacts are again shown for two bins in Fig. 3a as contacts 20a10, 20j10 and 21a10, 21j10. A third row of 10 printing magnets 56, 57 to 58 (Fig. 4) (total of say 20 for prices up to 20 shillings) are wired to terminals 67 on a jumpering frame for example similar to that in a telephone exchange and every stock bin has two terminals wired to the other side 68 of the jumpering frame, as indicated by wires 35A10, 36A10 and 35J10, 36J10 leading to the abovementioned contacts in Fig. 3a. Another set of 11 terminals on the jumpering frame is wired similarly to the next row of 11 magnets 60, 61 to 62 on the printer and this row of magnets prints the pence column. The connections shown by the dotted lines 69 and 70 represent the price of 1s. 11d. (counting the magnets from right to left). When for example the trip mechanism for the bin A10 is operated the contacts 20a10 and 21a10 are momentarily closed and cause via the connections 69 and 70 the energisation of magnets 56 and 62 respectively representing the first digit in the shillings printer and the last digit in the pence printer.

A shift mechanism represented by magnet 64 in the printer is operated from the relay P in Fig. 3a from earth via break contact 5b of "cancel" key 5 (Fig. 3), contact p2 (Fig. 3a), lead 41, magnet 64 (Fig. 4) to earth at a time when an article has been released and thus the card in the printer is shifted up one line and ready for the next entry. A further magnet 63 in the printer is energised via lead 42, whenever the "cancel" key 5 (Fig. 3) has been operated closing its contact 5c, to cancel the entry as well as move the card.

A second stock item, operating the second contact group 20j10, 21j10 (Fig. 3a) is priced at 2s. 11d. by means of the connections 71, 72 on the jumpering frame. It will be seen that a change in the price can easily be effected by changing the wiring on the jumpering frame.

The printer 66 is provided with registers of any well-known type whereby the total cost is added up and when the selection of a batch of articles is completed this total is printed on the card before its release. A special "batch completed" key 6 (Fig. 3) is provided for this purpose on the keyset. Its function is to operate a magnet 65 (Fig. 4) in the printer via lead 43 in order to register the total and release the card. The printer 66 will be placed somewhere near the common travelling belt so that the card when released from the printer will be carried to the ultimate place of delivery with the dispensed articles.

It will be clear that many modifications can be made in the arrangement described so far without departing from the spirit of the invention; for example, instead of operating the printer from the trip mechanism, it can be operated from contacts of the clutch magnet, or a relay can be provided which is operated by the selecting circuits and in turn operates the clutch magnet as well as the printer. The keyset (1), (2) . . . (0) in Fig. 3 can be used to operate a code-storing device 13, and the code-storing device then in turn controls the selecting and release mechanism. The code-storing device can also be used to control the printer for registering the price of selected articles. The code-storing device is inserted between the keys (1) to (0) and the contacts m1 to m10 as indicated at 13 in Fig. 3.

Code-storing device which can be used with the new dispensing system and which are worked by the operation of a key set are well known in the telephone field.

A code-storing device or register of this kind is shown in detail in Fig. 7 and Fig. 7a and corresponds in principle to the register as shown in the book "Introduction to the Strowger System of Automatic Telephony" by H. H. Harrison, Fig. 83.

This storage register is inserted between the terminals a—a', b—b', c—c' shown within the dotted lines 13 of Fig. 3. The short circuits between these terminals are removed, the contact n2 of relay N (Fig. 3a) is connected with terminal d' (Fig. 3) as shown by the dotted line, and corresponding terminals of the circuits of Fig. 3 and Figs. 7 and 7a are connected. Although only three leads are shown leading from the key set in Fig. 3 to the register in Fig. 7, it must be understood that ten leads are required to connect a full key set of 10 keys with the register. This is indicated in Fig. 7 by the dotted line between the leads from terminal b and terminal c. Thus the relays 1T and 2T (Fig. 7a) have ten contacts each (only three contacts for each relay: 1t1, 1t2, 1t0 and 2t1, 2t2, 2t0, being shown in the drawing). To simplify the drawing only two digit relays are shown for each digit storage group (relays 1D1 and 1D0 for the first digit storage group, relays 2D1 and 2D0 for the second digit group), but ten relays for each group must be provided to store the digits from 1 to 0 in each group. Each of these relays is connected with a corresponding contact of the relays 1T and 2T respectively.

The function of the register is as follows:

If, for example, the digit 1 is to be stored in the register, the key (1) (Fig. 3) is pressed and applies earth via the terminal a (Fig. 7) and the contact 1t1 (Fig. 7a) to relay 1D1, which forms part of the first digit storage group. The relay locks itself up from earth over the contact h1, relay 1K, its own contact 1d1-1, relay 1D1 to battery. Relay 1K operates over the same circuit and over its contact 1k1 closes the circuit for relay 1T which opens its contacts 1t1 to 1t0 and thus disconnects the relays 1D1 to 1D0 of the first digit storage group from the connections to the key set. Over the contact 1k2 the circuit is closed for the transfer relay 2T of the second digit storage group via the contact 2k1. The relay 2T closes its contacts 2t1 to 2t0 and thus connects the leads from the key set with the next digit storage group of relays 2D1 to 2D0. If the next key for example (0) is pressed, the corresponding digit relay 2D0 is operated over terminal c and contact 2t0 and locks itself up from earth over contact 1k2, relay 2K, its own contact 2d0-1, relay 2D0 to battery. The relay 2K opens its contact 2k1 and releases relay 2T thus disconnecting the relays 2D1 to 2D0 of the second digit storage group from the key set. A third, fourth or any number of digit storing relay groups can be added if required. The operation of all these relays is practically instantaneous so that the numbers can be selected at the key set quickly one after the other.

The operated digit relays close their respective contacts, for example 1d1-2 and 2d.0-2, and thus mark the leads to a selector switch in accordance with the digits keyed up at the key set. When the necessary digits making up the stock number or stock numbers of the articles to be selected have been stored, the operator presses a storage release key KS thus energising relay RK. This relay closes the circuit for itself from battery over its second winding, contact rk1 and in parallel over the contacts 1i2, 1k3 and 2i2, 2k2 to earth. At the same time relay G is energised over the same contacts and in turn operates relay H by closing its contact g1. Relay H operates its make before break contact h1 and thus earth for relay 1K is now provided over the contacts g2 and h1.

The transfer of the stored stock numbers into the relay selecting group shown in Figs. 3 and 3a, is carried out by a rotary switch with the three banks RS1, RS2 and RS3. The bank RS1 is connected with ten leads leading to the contacts of the digit storage relays.

Earth is applied to terminal d' via contact n2 (Fig. 3a) and when relay RK (Fig. 7) is operated the circuit is closed from earthed terminal d' via the back contact d3, contact rk2 and contact rm1 of the switch operating magnet RM through relay RR to battery. This relay steps the magnet RM forward over contacts rr1 and d1, and operates together with this magnet in a self-interrupting circuit. As soon as the switch has finished its first step, the earth coming over the terminal d' is replaced by the earth from the bank RS2 connected over the wiper with contact rm1 and thus the switch continues to step forward. When the wiper of the bank RS1 has reached the lead which is connected over a closed contact of a relay of the first digit group (for example 1d1-2) and the back contact 1i3, with earth, the relay D connected with the wiper is energised, thus interrupting at contact d1 the circuit for the magnet RM and closing a direct circuit for the relay D via the contact d2 and bank RS2. At the same time, the earth coming over terminal d' from the relay N (Fig. 3a) is switched over by contact d3 to the wiper RS3. Thus the earth is supplied to a selected lead at the bank RS3 corresponding to the first digit set up in the register and this earth fulfils the same functions in the relay selecting group (Fig. 3) as described before when the keys are directly connected with the contacts m1 to m10 of relay M (Fig. 3). In this way the first digit is transferred from the storage register into the selecting relay group. At the same time a circuit has been closed from earth via bank RS2, operated contact d2, back contact 1i1 and relay 1J to battery. This relay closes its contact 1j1, but relay 1I cannot operate as it is earthed on both sides.

Over contact d4 a slow operating relay OR is energised and thus the operating magnet RM is switched into a self-interrupting circuit over contacts d1, or1, rm1, switch RS2 to earth, thus stepping the switch quickly back to its initial position. As soon as the wiper of RS2 reaches its initial position, earth is removed from the lead to contact d2 and thus relay 1I can now operate in series with relay 1J over contacts h1 and g2 to earth. At the same time earth is removed from the circuit for relay D and this relay releases. Over the contacts of relay 1I a changeover is performed to the next digit storage group. Contact 1i1 switches the lead from wiper RS1 over to contact 2i1 thus preparing the circuit for relay 2J. Contact 1i2 opens so that the circuit for relay RK and relay G is now dependent upon the function of contact 2i2. Contact 1i3 transfers earth to the contact 2i3 and thus provides for the marking by the contacts of the second digit storage group.

The storage register is now ready to transfer the next digit into the selecting relay group (Figs. 3 and 3a). The same procedure is now performed as described before.

In the example given, selection of the articles is made by two digit stock numbers. To ensure that a second two digit stock number cannot be transferred from the storage register into the selecting relay group until selection of the first item is finished, the stepping up of the selector switch in the register is dependent on the earth applied via the contact n2 of the relay N (Fig. 3a). This contact is opened when the second digit has been put into the selecting relay group and remains open until an article is released. Thus no further digit can be transferred from the storage register into the selecting relay group until the first selection is fulfilled.

Any number of two digit stock numbers can be stored in the register when the necessary digit storage relays are provided.

When the last digit (for example the second digit) has been transferred from the register into the selecting relay group, earth is removed at contact 2i2 from the lead to contact rk1 of relay RK. This relay thus releases and at the same time releases relay G and H in turn. The circuit for the relays 1I and iJ is interrupted as well as the circuit through relay 1K and the operated relays of the relay storage group 1D1 to 1D0. By releasing these relays, the circuits operating the relays of the second group are interrupted also, so that the whole register returns to its initial position and is ready to store a new selection set up at the key set.

In Figs. 7 and 7a the relay groups for only two digits are shown but it is to be understood that more relay groups can be added in parallel to the wires leading to the terminals a, b, c . . . The connections from one relay group are continued to the next following relay group in the same way in which the first two relay groups are connected and as indicated by the dotted lines at contacts 2i1, 2i2 and 2i3.

The register described above shows only one type of code-storing device which can be used in connection with the new dispensing system. Other types of code-storing devices, for example, a code-storing device using rotary switches or other known methods of grouping relays, can be used.

When using a plurality of code-storing devices several operators can key whole series of codes or stock numbers without waiting and the need for the "busy" lamp can be obviated. Such a system will be described later on in connection with Figs. 5 and 6 where this principle is applied to permit the same conveyor mechanism to handle a number of separate batches of articles. Each batch follows the other in time and is distributed to a separate receptacle.

It will be clear also that a plurality of operator's positions can be used, all operating on the same series of bins. The multiplying leads 38, 39 and 40 in Fig. 3 show how other rows of keys similar to the one shown can be connected from other operators' positions. With the circuits as shown in Figs. 3 and 3a of course, the operators can only work one at a time. With an arrangement using code-storing devices it will be clear that several operators can work simultaneously to feed the requirements into the code-storing devices, just as in an automatic telephone system.

It should be noted that the stock numbers are preferably so arranged in relation to the travelling belt passing the bins that the lowest numbers are further away from the issuing end and the highest numbers nearer the issuing end. Since the list of articles will normally start with the lower numbers and go on to the higher numbers, this means that those bins furthest away from the issuing end will discharge their contents first on to the belt. In this way the issue of the total batch will be expedited.

When more than one item has to be issued from the same bin the operator presses the same stock number several times. Instead of this an additional row of keys could be added, which could be used by the operator to indicate the number of items to be issued for each stock bin. Such an arrangement would be applicable to the issue of items in fairly large numbers, for example to the issue of fruit. In the proposed method of carrying this out the keys indicating the quantity work a counting relay train and this relay train is counted out by a succession of impulses received back from the trip lever contact of the release mechanism. Alternatively, revertive impulses could be sent back to the release mechanism from the relay train until it has been counted out. Such an arrangement avoids any increase in the complexity of the equipment required on each bin and only requires one small counting train in the common equipment handled by the operator. The counting train would be operated by the trip contact and would control the clutch mechanism of the storage belt for the selected item. Instead of a relay counting train step-by-step switches can be used.

A detailed description of the arrangement for the selection of articles according to quantity is now given in connection with Fig. 8 and Fig. 8A.

Fig. 8 shows the key set for keying up the quantities wanted and a relay counting train. The key set as shown has only three keys (QB2), (QB3) and (QB4) for the selection of 2, 3 or 4 articles of the same kind, but it must be understood that any other keys for the selection of further quantities can easily be added without altering the principles of the circuit. Relay counting trains of the type shown are well-known and, for example, described in the British patent specifications 206,578 and 256,544.

Fig. 8A shows the circuit for selecting the various kinds of articles, which is in principle the same as the one shown in Figs. 3 and 3A. Only those parts are shown which are necessary to describe the selection, the same parts in Figs. 3 and 3A and in Fig. 8A being marked with the same reference letters. Two keys representing the digits (1) and (0) and a cancel key 5 are shown. As can be seen from a comparison with Fig. 3 an additional relay U is provided for each key and a relay QP switches the connections from the key set over to the counting arrangement.

The relays N and P are provided with additional contacts $n3$, $n4$ and $p3$, $p4$, $p5$ to control the selection according to quantity.

The operation of the various relays will now be described in detail in connection with the selection of articles. It may be assumed that three articles of the same kind with the stock number "10" shall be selected.

Before the operator starts with the selection of the stock number he presses the appropriate quantity key, in this case key (QB3) and thus operates relay 3QK which closes over its contact $3qk1$ a circuit from battery over its second winding, relay QP, contact $5a$ of key 5, contact $p1$ of relay P to earth. Over contact $3qk2$ the relay counting train with the Q and QA relays is marked for the quantity "3" from earth via contact $n3$ of relay N, contact $3qk2$, contact $3qa1$, relay 3Q to battery. The relay 3Q operates, closing its contacts $3q1$ and $3q2$. Over contact $3q1$ the relay 3QA is connected via contacts $1qa1$ and $p4$ to earth, but this relay cannot operate yet as it is earthed on both sides. Contact $3q2$ prepares a circuit for further counting operations.

The relay QP operates in the circuit described above and switches over its contacts $qp1$ to $qp10$ but this is without effect as the leads from the stock number selecting keys are not yet connected with these contacts.

When the operator has thus set the system to the quantity of articles of the same kind he wants to select, he starts with the selection of the stock number pressing the key (1) representing the first digit. As described in connection with Fig. 3 earth is applied via this key, contact $m1$, one winding of relay A, relay K to battery. Relay A closes its contacts $a1$ to $a11$ and establishes a locking circuit for its second winding over contact $a11$, contact $5a$ of key 5, contact $p1$ to earth. Relay K operates the slow release relay L over its contact $k1$. This relay prepares over contact $l1$ a circuit for relay M.

When the operator releases the key (1), the relay K is de-energised and closes a circuit from earth via contact $k1$, contact $l1$ (which is still closed as relay L is slow-releasing), one winding of relay M to battery. Relay M operates and locks itself from battery over its second winding, contact $m12$, contact $5a$ of key 5, contact $p1$ to earth. Over the contacts $m1$ to $m10$ the leads from the selection keys (1) to (0) are now switched over to the contacts $qp1$ to $qp10$, which were switched over by relay QP as mentioned above.

The operator continues now with the selection by pressing the key representing the second digit of the stock number, in this example key (0). This key closes a circuit for relay 10U from earth via key (0), contact $m10$, contact $qp10$, winding of relay 10U to battery. Relay 10U closes its contacts $10u1$ and $10u2$. Over contact $10u1$ a holding circuit is prepared for relay 10U which operates as soon as key (0) has been released. This circuit leads from battery via relay 10U, contact $10u1$, relay QH, contact $1qa3$ and contact $p3$ in parallel, contact $5b$ of key 5 to earth. The relay QH closes its contacts $qh1$ and $qh2$ and thus connects earth via contact $qh1$ and contact $1qa2$ to the holding circuits of the relays 3QK, QP, A and M, so that these relays remain operated, even if relay P opens its contact $p1$, as long as relay 1QA has not operated its contact $1qa2$. Over contact $qh2$ earth is applied to the relay counting train in parallel with earth over contacts $p4$ and $1qa1$.

Over contact $10u2$ the selector magnet 23A10 for the wanted kind of article is operated from battery via one winding of magnet 23A10, contact $a10$, contact $10u2$, front contact $3q2$, back contact $2q2$, back contact $1q2$, contact $n4$, contact $p5$ to earth.

The magnet 23A10 fulfils the functions of releasing an article from a bin as described in connection with Figs. 3 and 3a, and at the same time closes its contact $24a10$ establishing a holding circuit for its second winding via contact $24a10$, trip contact $22a10$, relay N, contact $5b$ of key 5 to earth. Relay N is thus energised and switches over its contact $n1$, at the same time opening its contacts $n3$ and $n4$. Over contact $n1$ a circuit is closed for the slow release relay O, which in turn prepares a circuit for the relay P over its contact $o1$. At contact $n3$ earth is removed from contact $3qk2$ and thus from the connection between relays 3QA and 3Q, so that relay 3QA can operate now in series with relay 3Q from battery via relay 3Q, relay 3QA, contact $3q1$, contact $qh2$ to earth. Relay 3QA switches over its contact $3qa1$, thus preparing a circuit for relay 2Q which operates when contact $n3$ closes again later on. At contact $n4$ the circuit for the first (upper) winding of magnet 23A10 is interrupted but the magnet is still kept in the operated position over its second (lower) winding as described above.

When the first of the wanted articles is released from the bin, the article operates the trip contact $22a10$ opening this contact for a short time. This opening of contact $22a10$ interrupts the holding circuit for magnet 23A10, and relay N. Magnet 23A10 releases, opening its contact 24a10, and relay N switches back its contact n1 and closes again its contacts n3 and n4.

Over contact n1 the relay P is energised for a short time, as contact o1 is still closed, relay O being a slow release relay. The closing of contact n4 has no effect as earth is still removed from the circuit at contact p5. Over contact n3 earth is now applied via contact 3qk2, contact 3qa1, contact 2qa1, relay 2Q to battery. The relay 2Q prepares a circuit for relay 2QA over contact 2q1, but this relay cannot operate yet as it is earthed on both sides.

The interruption of the circuits at the contacts p1, p3 and p4 is without effect as parallel circuits over the contacts qh1 and 1qa2, contact 1qa3, and contact qh2 respectively are still closed.

When slow release relay O opens its contact o1, relay P is de-energised again and over its contact p5 closes a circuit from earth over contact p5, contact n4, back contact 1q2, front contact 2q2, contact 10u2, contact a10, magnet 23A10 to battery. Thus magnet 23A10 is energised again for the release of the next article and the whole cycle of operation repeats itself as described above. When relay N has opened its contact n3 the relay 2QA operates in series with relay 2Q in the same way as described for the relay 3Q and 3QA, so that when the second article has been discharged the relay 1Q is energised from battery via relay 1Q, front contact 2qa1, front contact 3qa1, contact 3qk2, contact n3 to earth. Relay 1Q closes its contact 1q2 to establish a new circuit for the magnet 23A10 when the second article has been released and the relay P has released again.

When the magnet 23A10 has been energised for the third time and relay N has operated, earth is removed from the connection between the relays 1QA and 1Q at contact n3 and thus relay 1QA is energised in series with relay 1Q from battery over relay 1Q, relay 1QA, contact 1q1, contact qh2 to earth. Relay 1QA opens its contacts 1qa1, 1qa2 and 1qa3 and thus the holding circuit for the relay counting train with the operated relays 1Q, 1QA, 2Q, 2QA and 3Q, 3QA is dependent on contact qh2 of relay QH and this relay in series with relay 10U is dependent on contact p3 of relay P.

When after the release of the third article relay P is energized for a short time as described above, the circuit for the relay QH and 10U is interrupted thus restoring these relays to their initial position. At qh2 earth is removed from the relay counting train restoring all the relays of this circuit to normal. The contact p1 removes earth from the leads to the second windings of relays M and A, the relay QP and the second winding of relay 3QK and thus releases these relays. The whole circuit is thus again in its initial state and a new selection can be effected.

If at any stage during selection a cancellation is to be made, the cancel key 5 is operated. This key breaks its contacts 5a and 5b and removes earth from the circuits holding the various relays and thus restores the circuit to its normal position before the whole cycle of operations has been completed.

Turning now to Figs. 5 and 6, these figures illustrate in more detail the use of code storing devices and of a plurality of delivery receptacles.

In Fig. 5, the articles are stored in article-holding devices or bins 8 of the bin arrangement 124 and the selected articles are discharged on to travelling belts 9 as already described. The supports for these belts are indicated diagrammatically at 73 and the rollers driving the belts at 74. The belts discharge the articles on to the chutes 10 and thus to the main conveyor belt 11 which leads to the receptacles. The rollers for driving the main conveyor belt are indicated at 12.

In the embodiment shown in Fig. 5 the system permits the articles to be directed to one of four receptacles or bins 75, 76, 77 and 78 this being done by means of a displaceable guide member (Fig. 9) with guides 80 which are carried above the main conveyor belt 11 just clearing it. These guides are held by means of supports 81, and can be turned to lead the articles to any one of the four bins 75 to 78, by means of the mechanism shown in detail in Figs. 9a, 9b and 9c.

The displaceable guide member is fixed on a base 129 (Fig. 9) carried by two brackets 130, which are suitably secured to the delivery counter 122 including the bins 75 to 78. A motor 131 driving the displaceable guide member is fixed to one of the brackets 130.

Motor 131 (Fig. 9a) is running permanently and drives over a belt or chain 132 a tooth wheel 84 which can mesh with another tooth wheel 83. Tooth wheel 83 (Fig. 9c) is of the flexible type and is normally held out of engagement with tooth wheel 84 by armature 86 of magnet 85 under the action of a spring 133. Magnet 85 with armature 86 and flexible tooth wheel 83 act as a magnetic clutch of the same type as used for the connection of the belts in the various bins with the common driving shaft, and described above in connection with Figs. 2a and 2b.

Tooth wheel 83 (Fig. 9b) is fixed to a shaft 82 which is rotatably mounted on the base 129 and carries at its lower end a boss 134 to which are fixed the supports 81 carrying the guides 80. The upper part of shaft 82 carries two bushes 135 and 136, with the switch wipers 87 and 88 respectively. Wiper 87 passes over the contact banks 87a and wiper 88 passes over the contact bank 88a and the electrical connection to the wipers is established by the contact springs 137 and 138 (Figs. 9a and 9c) gliding on the bushes 135 and 136 respectively, when the shaft 82 rotates. The contact banks 87a, 88a as well as the contact springs 137, 138 are mounted on the base 129 on studs 139 and 140 respectively.

In the example shown the displaceable guide member is designed for the distribution of articles to four different bins and thus four contacts each are provided at the contact banks 87a and 88a. The flexible tooth wheel 83 has four holes 141 (Fig. 9a) spaced at the same distance as the contacts on the contact banks and a pin at the end of armature 86 can engage one of these holes when the armature is in its unoperated position under action of spring 133.

When the magnet 85 is operated it attracts its armature 86 thus pulling the pin out of one of the four holes 141 in the wheel 83, and at the same time permitting the wheel 83 to flex into contact with the wheel 84. Tooth wheel 84 is thus driven by motor 131, and the shaft 82 with its boss 134 moves the guides 80 until they point to the required receptacle.

In order to move the guides 80 from receptacle 78 back to receptacle 75 the whole mechanism continues to rotate until it reaches the position of 75. It will be clear that a reversing mechanism with an extra clutch to connect the guides with a second driving shaft going in the opposite direction or a second gear wheel on the existing shaft could be very easily arranged.

Instead of mounting the switch wipers 87 and 88 on the shaft 82 a separate shaft coupled with shaft 82 could carry the two switch wipers 87 and 88. Switch 87, 87a is used to indicate that the mechanism is ready to receive a new batch of articles, for example to start a code-storing device as will be described later on in connection with Fig. 6. Switch 88, 88a is used to centre the guides 80.

The operation of the displaceable guide member and its functions in connection with the release of articles from the various bins will now be described in detail.

Attached to the conveyor belt 9 (Fig. 5) is a small dividing member 89 which serves the dual purpose of sweeping all the articles along to the chute 10 and thus achieving a positive clearance of all those articles released within a certain time from the bins 8 and secondly, operating certain contacts 90, 91 and 92 placed at different positions along the belt, and operated during the return of the member 89. Contact 90 is so spaced along the belt that all the articles pushed down the chutes 10 by the member 89 will have been delivered into the receptacles by the main conveyor belt 11 before the member 89 reaches contact 90. Contact 90 operates relay 94 which closes its contact 95 and thus operates the clutch magnet 85 and causes movement of the guides 80 as described above.

Immediately the shaft 82 moves, the holding winding of relay 94 is energised, since the wiper 88 leaves the narrow contact segment of contact bank 88a on which it was last standing thus removing a short circuit across this winding. Contact 95 therefore remains closed although contact 90 again opens. When the guides 80 are directly opposite the next receptacle, the wiper 88 will make contact with the next narrow segment which again short circuits the holding winding of relay 94 thus causing the relay to release, releasing clutch magnet 85 and thus centring the guides at the next receptacle. The pin at armature 86 on its release enters a hole 141 in the wheel 83, and thus any forces caused by the articles impinging on the guides will not be able to move the guide mechanism. While the movement of the guides is taking place the member 99 will continue to travel and will operate contact 91 thus operating relay 93. Relay 93 locks over its own contact 96, and break contact 92 and over contact 79 places earth on wiper 87 and thus on one of the leads 97, 98, 99, 100 depending on the position of the guides 80 to start the code-storing devices as will be described later in connection with Fig. 6, or to give an indication to an operator's position that the guides are set for the next selection. The selection of the wanted articles then proceeds and the articles fall out of the bins 8 onto the conveyor belt 9. When the member 89 on its further travel opens temporarily the contact 92 this releases relay 93 which in turn removes earth at contact 79 from wiper 87 and thus from the leads 97 to 100, thereby indicating that no more articles are to be selected for this batch. The member 89 in a positive manner collects all those articles which have been discharged onto the belt 9 and pushes them to the chute 10 from where they are conveyed to one of the receptacles. The sequence is then repeated for the next receptacle in the same way.

The contacts 90, 91 and 92 will appear on only one conveyor belt in a group. The indications received from this belt will be valid however for all other belts since these belts are geared together.

It will be clear that the association of the member 89 with the belt 9 is in no way essential and that a separate timing device to operate the contacts 90, 91 and 92 could be employed without departing from the spirit of the invention.

Turning now to Fig. 6, this drawing shows four operators' positions, each equipped with a keyset as shown at 101, 102, 103, 104 and an associated code-storing device 105, 106, 107, 108. Green lamps 109, 110, 111, 112 light up when the code-storing device associated therewith is free.

The foregoing description of Figs. 3 and 3a shows a method in which earth applied to ten wires from a keyset can be used to operate one hundred bin release mechanisms in accordance with the indications given by two succeeding impulses of earth applied to these ten leads by two successive depressions of the keys by the operator. It is well known in the automatic telephone are to provide such a sequence of impulses or coded combinations from code-storing devices instead of direct from an operator.

Thus in Fig. 6 ten leads represented by cable 113 are brought out from the code-storing devices, and are connected with the circuit of Figs. 3 and 3a as indicated by the terminals $a''$, $b''$, and $c''$ in Fig. 3 and Fig. 6 instead of the keys (1), (2) and (0) in Fig. 3. These leads receive earth from the code-storing devices exactly as if they were connected to the keyset of Fig. 3. These earths operate via the contacts $m1$ to $m10$ the relays A to J (Fig. 3) and thus the release mechanisms such as 23A1 to 23J10 (Fig. 3a). A plurality of groups of ten wires such as 113 (Fig. 6) will be provided from the code-storing devices when more than one group of bins has to be operated. Whereas Figs. 7 and 7a show a code-storing device where each key is connected with a separate lead and 10 relays are used in each digit storage group, the keysets 101 to 104 (Fig. 6) consist of keys which provide earth on one or more of five wires, a different combination of the five earths being used to indicate each digit in a manner well known in the automatic telephone art. For each bin which has to be operated there appear in the code-storing device two groups of five relays, one of which records the first digit and the other the second digit allotted to a particular bin. These groups of relays are operated by the keyset and as soon as one set has recorded a bin number, an automatic switch moves the five connections on to the next group of ten relays for the next bin number to be recorded and so on. Thus by providing ten such groups of relays ten separate bin numbers can be recorded in the code-storing devices, or by providing more, more bin numbers can be recorded without limit. A red lamp 114, 115, 116, 117 lights when the corresponding code-storing device is full and tells the operators that they must wait until part of the code-storing device is discharged before adding any more to the order. The wires 97, 98, 99, 100 cause the code-storing device to start the discharge when an earth appears from the main control mechanism, for example from switch wiper 87 (Fig. 5). Earth on switch wiper 87 is equivalent to earth on key KS (Fig. 7) for starting the code-storing device shown in Figs. 7 and 7A. This earth is applied by the control mechanism only when the conveyor gear is clear and ready to take the articles to the correct receptacle. When the signal is received the code-storing device places earth on the ten wires, together with any control wires that may be necessary (indicated diagrammatically by the cable 113) in exactly the same way as the operator did in the case of Fig. 3. It will be observed that cable 113 is multiplied to all code-storing devices so that the same bin can be selected no matter which code-storing device is operated. The whole delivering and conveying mechanism remains unchanged and the guides 80 (Fig. 5) and their associated gear determine which of the four code-storing devices operates and which receptacle receives the selected articles.

The arrangement can be modified in many respects without departing from the spirit of the invention. There is a very big technique in the automatic telephone field for controlling code-storing devices and release mechanism and any such technique can be regarded as applicable to the present invention. For example one key set could be used to set up any of one thousand or ten thousand numbers and thus control an unlimited number of bins by means of only one row of ten keys, using register principles well known in the art.

The indication applied to the cable 113 (Fig. 6) by the code-storing devices can be varied from those put into the code-storing devices by the keysets. For example, the operator may key send into the code-storing device the digits 938 and the code-storing device, by methods well known in the art, may be caused to send out quite different digits, for example 431. In this manner the relationship between the digit numbers and the positioning of the bins is eliminated. This permits bins of different sizes to be grouped together, to take different kinds of packages and to carry numerical sequences such as are desirable for upkeep and record purposes without these numbers and positions bearing any relation to the actual stock numbers listed in the stock list or catalogue used by the operators.

By suitable connections inside the code-storing device it can be arranged if necessary that certain numbers or groups of numbers are not releasable by certain operators. Thus if an article is in particularly short supply arrangements may be made whereby only one operator has any authority to release this item and the others are barred. Arrangements of this kind are used in automatic telephone field and for example shown in Aust. Pat. No. 17,996/34.

It will be clear that the code-storing device can be designed to record the quantity of articles required from each bin, by means of a second keyset and a second group of recording relays, by switches or in any other manner.

It must be understood that the various conveyor mechanisms are only shown by way of example and can be changed in many ways without departing from the spirit of the invention. For example, the chutes 10 in Fig. 1 can be replaced by travelling belts. Where breakable articles have to be carried this would probably be necessary. Also the belts can carry ribs so that they are broken up into pockets to prevent goods rolling. Alternatively, the belts could consist of a series of trays or other receptacles linked together.

I claim:

1. A system for dispensing articles of varied character according to coded designations thereof, comprising: a plurality of article-holding devices, one for articles of each code, each article-holding device including an electrically actuated releasing device for discharging said articles from said article-holding device; means for selecting any said releasing device for actuation in accordance with its allotted code, said means including a set of electrical contact members operable in accordance with any said code; a code-storing device and electrical connections therefrom to said contact members for actuation thereby, said code-storing device including code-storing means electrically operable by said contact members to store the elements of said code; means including a group of selecting switching means, electrically connected with and selectively responsive to said code-storing device in accordance with said code, for selecting and actuating the selected releasing device, and means for releasing said code-storing device to actuate said selecting switching means in accordance with said code.

2. A system for dispensing articles of varied character according to coded designations thereof, comprising: a plurality of article-holding devices, one for each code, each article-holding device including an electrically actuated releasing device for discharging said articles from said article-holding device; means for selecting any said releasing device for actuation in accordance with its allotted code, said means including a set of electrical contact members operable in accordance with any said code; a code-storing device for storing said code, said code-storing device including a plurality of groups of storage relays for storing elements of any said code, means including electrical connections from said contact members to contacts in multiple of successive storage relays of said groups, respectively, for selectively actuating the same in accordance with any said code, stepping selector switching means selectively responsive to said storage relays in accordance with said selective actuation thereof; means including a group of selecting switching means for selecting and actuating the selected releasing device; and electrical connections from contacts of said stepping selector switching means to said group of selecting switching means for selectively actuating said selecting switching means in accordance with said code stored in said code-storing device.

3. A system for dispensing articles of varied character according to coded designations thereof, comprising: a plurality of article-holding devices, one for each code, each article-holding device including an electrically actuated releasing device for discharging said articles from said article-holding device; means for selecting any said releasing device for actuation in accordance with its allotted code, said means including a plurality of sets of electrical contact members operable in accordance with any said code; a plurality of code-storing devices individual to said sets of contact members and electrically connected therewith, each said code-storing device including code-storing means electrically operable by said contact members of a corresponding set for storing the elements of said code; means including a group of selecting switching means, selectively responsive to said code-storing devices in accordance with said code, for selecting and actuating the selected releasing device; means connecting said code-storing devices in multiple to said group of selecting switching means; and means for energising said code-storing devices in a predetermined sequence successively to actuate said selecting switching means in accordance with the codes stored in said devices respectively.

4. A system for dispensing articles of varied character according to coded designations thereof, comprising: a plurality of article-holding devices, one for each code, each article-holding device including an electrically actuated releasing device for discharging said articles from said article-holding device; collecting conveyor means common to said article-holding devices for collecting and conveying discharged articles, said collecting conveyor means including a displaceable guide member for conveying said articles to different delivery points; electrical control means associated with said collecting conveyor means and operable thereby to displace said guide member in a predetermined sequence; means for selecting any said releasing device for actuation in accordance with its allotted code, said means including a plurality of sets of electrical contact members operable in accordance with any said code; a plurality of code-storing devices individual to said sets of contact members and operable thereby; means including a group of selecting switching means, selectively responsive to said code-storing devices in accordance with said code, for selecting and actuating the selected releasing device; means connecting said code-storing devices in multiple to said group of selecting switching means; and means including electrical contact means associated with said guide member and operated therewith for energising said code-storing devices in said predetermined sequence to actuate said selecting switching means in accordance with the codes stored in said devices respectively.

5. A system for dispensing articles of varied character according to coded designations thereof, comprising: a plurality of article-holding devices, one for each code, each article-holding device including an electrically actuated releasing device for discharging said articles from said article-holding device; means for selecting any said releasing device for actuation in accordance with its allotted code, said means including a set of electrical contact members operable in accordance with any said code; a code-storing device and electrical connections therefrom to said contact members for actuation thereby to store said code; means including value-registering and -indicating means common to all said storage devices and responsive to the actuation of said code-storing device by said contact members for registering the value of each article selected by said contact members; means including a group of selecting switching means, selectively responsive to said code-storing device in accordance with said code, for selecting and actuating the selected releasing device; and means for releasing said code-storing device to actuate said selecting switching means in accordance with said code.

6. A system for dispensing articles of varied character according to coded designations thereof, comprising: a plurality of article-holding devices, one for each code, each article-holding device including an electrically actuated releasing device for discharging said articles from said article-holding device; means for selecting any said releasing device for actuation in accordance with its allotted code, said means including a set of electrical contact members operable in accordance with any said code; a code-storing device and electrical connections therefrom to said contact members for actuation thereby to store said code; means including a group of selecting switching means, selectively responsive to said code storing device in accordance with said code, for selecting and actuating the selected releasing device; value-registering and -indicating means common to all said storage devices and responsive to said actuation of said selecting switching means by said code-storing device for registering the value of each article dispensed thereby; and means for releasing said code-storing device to actuate said selecting switching means in accordance with said code.

THOMAS S. SKILLMAN.

References Cited in the file of this patent

UNITED STATES PATENTS

| Number | Name | Date |
| --- | --- | --- |
| 2,374,537 | Goldsmith | Apr. 24, 1945 |